US007996009B2

(12) United States Patent
Mohammed

(10) Patent No.: US 7,996,009 B2
(45) Date of Patent: Aug. 9, 2011

(54) METHOD FOR AUTHENTICATING ACCESS TO AN UNLICENSED WIRELESS COMMUNICATIONS SYSTEM USING A LICENSED WIRELESS COMMUNICATIONS SYSTEM AUTHENTICATION PROCESS

(75) Inventor: Jahangir Mohammed, Mountain View, CA (US)

(73) Assignee: Kineto Wireless, Inc., Milpitas, CA (US)

( * ) Notice: Subject to any disclaimer, the term of this patent is extended or adjusted under 35 U.S.C. 154(b) by 2445 days.

(21) Appl. No.: 10/116,023

(22) Filed: Apr. 2, 2002

(65) Prior Publication Data

US 2005/0207395 A1 Sep. 22, 2005

Related U.S. Application Data

(63) Continuation of application No. 09/912,789, filed on Jul. 24, 2001, now abandoned.

(60) Provisional application No. 60/271,769, filed on Feb. 26, 2001, provisional application No. 60/271,768, filed on Feb. 26, 2001, provisional application No. 60/271,767, filed on Feb. 26, 2001, provisional application No. 60/271,766, filed on Feb. 26, 2001.

(51) Int. Cl.
*H04W 4/00* (2009.01)

(52) U.S. Cl. ..................... 455/435.1; 455/436; 455/437; 455/438; 455/439; 455/440; 455/441; 455/442; 455/443; 455/444; 455/411

(58) Field of Classification Search .................. 455/411, 455/435.1, 410, 436–444
See application file for complete search history.

(56) References Cited

U.S. PATENT DOCUMENTS

| | | | |
|---|---|---|---|
| 5,101,501 | A | 3/1992 | Gilhousen et al. |
| 5,109,528 | A | 4/1992 | Uddenfeldt |
| 5,226,045 | A | 7/1993 | Chuang |
| 5,235,632 | A | 8/1993 | Raith |
| 5,260,944 | A | 11/1993 | Tomabechi |
| 5,260,988 | A | 11/1993 | Schellinger et al. |
| 5,267,261 | A | 11/1993 | Blakeney, II et al. |
| 5,327,578 | A | 7/1994 | Breeden et al. |
| 5,333,175 | A | 7/1994 | Ariyavisitakul et al. |
| 5,367,558 | A | 11/1994 | Gillig et al. |
| 5,390,233 | A | 2/1995 | Jensen et al. |

(Continued)

FOREIGN PATENT DOCUMENTS

EP 0 936 777 A1 8/1999

(Continued)

OTHER PUBLICATIONS

U.S. Appl. No. 10/688,470 (Non-Final Office Action), filed Oct. 17, 2003, Gallagher, Michael D.

(Continued)

*Primary Examiner* — Pierre-Louis Desir
*Assistant Examiner* — Shantell Heiber
(74) *Attorney, Agent, or Firm* — Adeli & Tollen LLP

(57) ABSTRACT

A method of authenticating a user seeking access to an unlicensed wireless communication system includes delivering to an unlicensed wireless communication subscriber device licensed wireless communication system security information. An authentication result produced by the subscriber device is processed in response to the licensed wireless communication system security information. The authentication result is compared with an authentication value to selectively produce an authentication command. Unlicensed wireless communication between the subscriber device and an unlicensed wireless communication system base station is enabled in response to the authentication command.

22 Claims, 13 Drawing Sheets

U.S. PATENT DOCUMENTS 5,392,331 A 2/1995 Patsiokas et al.
5,406,615 A * 4/1995 Miller et al. ............... 455/552.1
5,428,601 A 6/1995 Owen
5,442,680 A 8/1995 Schellinger et al.
5,445,619 A 8/1995 Burns
5,448,619 A 9/1995 Evans et al.
5,475,677 A 12/1995 Arnold et al.
5,488,649 A 1/1996 Schellinger
5,507,035 A 4/1996 Bantz et al.
5,509,052 A 4/1996 Chia et al.
5,515,420 A 5/1996 Urasaka et al.
5,533,027 A 7/1996 Akerberg et al.
5,594,782 A 1/1997 Zicker et al.
5,610,969 A 3/1997 McHenry et al.
5,634,193 A 5/1997 Ghisler
5,640,414 A 6/1997 Blakeney, II et al.
5,659,598 A 8/1997 Byrne et al.
5,659,878 A 8/1997 Uchida et al.
5,664,005 A 9/1997 Emery et al.
5,673,307 A 9/1997 Holland et al.
5,675,629 A 10/1997 Raffel et al.
5,724,658 A 3/1998 Hasan
5,732,076 A 3/1998 Ketseoglou et al.
5,745,852 A 4/1998 Khan et al.
5,758,281 A 5/1998 Emery et al.
5,796,727 A 8/1998 Harrison
5,796,729 A 8/1998 Greaney et al.
5,812,522 A 9/1998 Lee et al.
5,815,525 A 9/1998 Smith
5,818,820 A 10/1998 Anderson et al.
5,822,681 A 10/1998 Chang et al.
5,822,767 A 10/1998 MacWilliams
5,825,759 A 10/1998 Liu
5,852,767 A 12/1998 Sugita
5,862,345 A 1/1999 Okanoue et al.
5,870,677 A 2/1999 Takahashi et al.
5,887,020 A 3/1999 Smith et al.
5,887,260 A 3/1999 Nakata
5,890,055 A 3/1999 Chu et al.
5,890,064 A 3/1999 Widergen et al.
5,903,834 A 5/1999 Wallstedt et al.
5,915,224 A 6/1999 Jonsson
5,926,760 A 7/1999 Khan et al.
5,936,949 A 8/1999 Pasternak et al.
5,940,512 A * 8/1999 Tomoike ....................... 380/248
5,946,622 A 8/1999 Bojeryd
5,949,773 A 9/1999 Bhalla et al.
5,960,341 A 9/1999 LeBlanc et al.
5,960,361 A 9/1999 Chen
5,960,364 A 9/1999 Dent
5,987,010 A 11/1999 Schnizlein
5,995,828 A 11/1999 Nishida
6,016,318 A 1/2000 Tomoike
6,035,193 A 3/2000 Buhrmann et al.
6,052,592 A 4/2000 Schellinger et al.
6,101,176 A 8/2000 Honkasalo et al.
6,112,080 A 8/2000 Anderson et al.
6,112,088 A 8/2000 Haartsen
6,119,000 A 9/2000 Stephenson et al.
6,130,886 A 10/2000 Ketseoglou et al.
6,134,227 A 10/2000 Magana
6,138,019 A 10/2000 Trompower et al.
6,226,515 B1 5/2001 Pauli et al.
6,236,852 B1 * 5/2001 Veerasamy et al. ........... 455/411
6,243,581 B1 6/2001 Jawanda
6,256,511 B1 7/2001 Brown
6,263,211 B1 7/2001 Brunner
6,269,086 B1 7/2001 Magana et al.
6,320,873 B1 11/2001 Nevo et al.
6,327,470 B1 12/2001 Ostling
6,359,872 B1 3/2002 Mahany et al.
6,374,102 B1 4/2002 Brachman et al.
6,381,457 B1 4/2002 Carlsson et al.
6,389,059 B1 5/2002 Smith et al.
6,415,158 B1 7/2002 King et al.
6,426,819 B1 7/2002 Crimmins et al.
6,430,395 B2 8/2002 Arazi
6,445,921 B1 9/2002 Bell
6,463,307 B1 10/2002 Larsson et al.
6,498,934 B1 12/2002 Muller
6,539,237 B1 * 3/2003 Sayers et al. .................. 455/555
6,542,516 B1 4/2003 Vialen et al.
6,553,219 B1 * 4/2003 Vilander et al. .............. 455/411
6,556,822 B1 4/2003 Matsumoto
6,556,825 B1 4/2003 Mansfield
6,556,830 B1 4/2003 Lenzo
6,574,266 B1 6/2003 Haartsen
6,587,444 B1 7/2003 Lenzo et al.
6,600,925 B1 7/2003 Rams
6,633,614 B1 10/2003 Barton et al.
6,633,761 B1 10/2003 Singhal
6,643,512 B1 11/2003 Ramaswamy
6,647,426 B2 11/2003 Mohammed
6,658,250 B1 12/2003 Ganesan et al.
6,665,276 B1 12/2003 Culbertson et al.
6,675,009 B1 1/2004 Cook
6,680,923 B1 1/2004 Leon
6,708,033 B1 3/2004 Linkola et al.
6,711,400 B1 * 3/2004 Aura ............................ 455/411
6,766,160 B1 7/2004 Lemilainen et al.
6,788,656 B1 9/2004 Smolentzov
6,795,701 B1 9/2004 Baker et al.
6,801,519 B1 10/2004 Mangel
6,801,772 B1 10/2004 Townend et al.
6,801,777 B2 10/2004 Rusch
6,807,417 B2 10/2004 Sallinen
6,824,048 B1 11/2004 Itabashi
6,826,154 B2 11/2004 Subbiah et al.
6,829,227 B1 12/2004 Pitt
6,842,462 B1 * 1/2005 Ramjee et al. ................ 370/466
6,845,095 B2 1/2005 Krishnarajah et al.
6,850,503 B2 2/2005 Dorenbosch et al.
6,853,851 B1 2/2005 Rautiola et al.
6,871,063 B1 * 3/2005 Schiffer ........................ 455/410
6,895,255 B1 5/2005 Bridgelall
6,909,705 B1 6/2005 Lee et al.
6,922,559 B2 7/2005 Mohammed
6,925,074 B1 8/2005 Vikberg et al.
6,937,862 B2 8/2005 Back et al.
6,957,249 B2 10/2005 Salo et al.
6,970,719 B1 * 11/2005 McConnell et al. ....... 455/554.1
6,993,359 B1 1/2006 Nelakanti et al.
7,009,952 B1 3/2006 Razavilar et al.
7,039,025 B1 5/2006 Menon et al.
7,039,027 B2 5/2006 Bridgelall
7,099,339 B1 8/2006 Wang et al.
7,257,386 B1 * 8/2007 McDonnell et al. .......... 455/403
7,272,397 B2 9/2007 Gallagher et al.
7,283,822 B2 10/2007 Gallagher et al.
7,454,207 B2 11/2008 Gallagher et al.
2001/0029186 A1 10/2001 Canyon et al.
2001/0031645 A1 10/2001 Jarrett
2001/0046860 A1 11/2001 Lee
2001/0049790 A1 12/2001 Faccin
2002/0012433 A1 * 1/2002 Haverinen et al. ............ 380/247
2002/0045459 A1 4/2002 Morikawa
2002/0066036 A1 5/2002 Makineni
2002/0075844 A1 6/2002 Hagen
2002/0082015 A1 6/2002 Wu
2002/0083344 A1 6/2002 Vairavan
2002/0085516 A1 7/2002 Bridgelall
2002/0102974 A1 8/2002 Raith
2002/0118674 A1 8/2002 Faccin et al.
2002/0131387 A1 9/2002 Pitcher et al.
2002/0132630 A1 9/2002 Arazi et al.
2002/0142761 A1 10/2002 Wallstedt
2002/0147008 A1 10/2002 Kallio
2002/0147016 A1 10/2002 Arazi et al.
2002/0155829 A1 10/2002 Proctor et al.
2002/0160811 A1 10/2002 Jannette
2002/0161905 A1 10/2002 Haverinen et al.
2002/0164984 A1 11/2002 Thakker
2002/0166068 A1 11/2002 Kilgore
2002/0191575 A1 12/2002 Kalavade
2002/0191596 A1 12/2002 Moyano et al.
2002/0196840 A1 12/2002 Anderson et al.
2002/0197984 A1 12/2002 Monin et al.

2003/0007475 A1 1/2003 Tsuda et al.
2003/0031151 A1 2/2003 Sharma et al.
2003/0043773 A1 3/2003 Chang
2003/0087653 A1 5/2003 Leung
2003/0112789 A1 6/2003 Heinonen
2003/0119480 A1 6/2003 Mohammed
2003/0119489 A1 6/2003 Mohammed
2003/0119490 A1 6/2003 Mohammed
2003/0119527 A1 6/2003 Labun
2003/0119548 A1 6/2003 Mohammed
2003/0130008 A1 7/2003 Rajaniemi et al.
2003/0139180 A1 7/2003 McIntosh et al.
2003/0142673 A1 7/2003 Patil et al.
2003/0154306 A1 8/2003 Perry
2003/0172264 A1 9/2003 Dillon
2003/0176181 A1 9/2003 Boesjes
2003/0176186 A1 9/2003 Mohammed
2003/0193952 A1 10/2003 O'Neill
2003/0202486 A1 10/2003 Anton, Jr. et al.
2003/0206533 A1 11/2003 Charas
2003/0210199 A1 11/2003 Sward
2003/0219022 A1 11/2003 Dillon et al.
2003/0219024 A1 11/2003 Purnadi et al.
2003/0226017 A1 12/2003 Palekar et al.
2004/0003060 A1 1/2004 Asoh et al.
2004/0008649 A1 1/2004 Wybenga et al.
2004/0009749 A1 1/2004 Arazi et al.
2004/0013099 A1 1/2004 O'Neill
2004/0025018 A1 2/2004 Haas et al.
2004/0037312 A1 2/2004 Spear
2004/0053623 A1 3/2004 Hoff et al.
2004/0068571 A1* 4/2004 Ahmavaara .................. 709/228
2004/0068653 A1 4/2004 Fascenda
2004/0077346 A1 4/2004 Krenik et al.
2004/0077354 A1 4/2004 Jason et al.
2004/0077355 A1 4/2004 Krenik et al.
2004/0077356 A1 4/2004 Krenik et al.
2004/0077374 A1 4/2004 Terry
2004/0116120 A1 6/2004 Mohammed et al.
2004/0147223 A1 7/2004 Cho
2004/0152482 A1 8/2004 Raffel et al.
2004/0171378 A1 9/2004 Rautila
2004/0192211 A1 9/2004 Gallagher et al.
2004/0202132 A1 10/2004 Heinonen
2004/0203346 A1 10/2004 Myhre et al.
2004/0203737 A1 10/2004 Myhre et al.
2004/0203800 A1 10/2004 Myhre et al.
2004/0203815 A1 10/2004 Shoemake
2005/0064896 A1 3/2005 Rautiola et al.
2005/0101245 A1 5/2005 Ahmavvaara
2005/0101329 A1 5/2005 Gallagher
2005/0181805 A1 8/2005 Gallagher
2005/0186948 A1 8/2005 Gallagher
2005/0198199 A1 9/2005 Dowling
2005/0207395 A1 9/2005 Mohammed
2005/0210154 A1 9/2005 Verma et al.
2005/0239441 A1 10/2005 Eronen
2005/0239453 A1 10/2005 Vikberg et al.
2005/0255879 A1 11/2005 Shi
2005/0265279 A1 12/2005 Markovic
2005/0266853 A1 12/2005 Gallagher
2005/0271008 A1 12/2005 Gallagher
2005/0272424 A1 12/2005 Gallagher
2005/0272449 A1 12/2005 Gallagher
2006/0009201 A1 1/2006 Gallagher
2006/0009202 A1 1/2006 Gallagher
2006/0019656 A1 1/2006 Gallagher
2006/0019657 A1 1/2006 Gallagher
2006/0019658 A1 1/2006 Gallagher
2006/0025143 A1 2/2006 Gallagher
2006/0025144 A1 2/2006 Gallagher
2006/0025145 A1 2/2006 Gallagher
2006/0025146 A1 2/2006 Gallagher
2006/0025147 A1 2/2006 Gallagher
2006/0079258 A1 4/2006 Gallagher
2006/0079259 A1 4/2006 Gallagher
2006/0079273 A1 4/2006 Gallagher
2006/0079274 A1 4/2006 Gallagher
2006/0094431 A1 5/2006 Saifullah et al.
2006/0098598 A1 5/2006 Gallagher
2006/0172732 A1 8/2006 Nylander et al.
2007/0293222 A1 12/2007 Vikberg et al.
2008/0132207 A1 6/2008 Gallagher et al.

FOREIGN PATENT DOCUMENTS

EP 0936777 A1 8/1999
EP 1 207 708 A1 5/2002
EP 1207708 B1 10/2004
GB 2 282 735 A 4/1995
WO WO 92/04796 3/1992
WO WO 97/24004 7/1997
WO WO 99/48312 9/1999
WO WO 99/48315 9/1999
WO WO 9948312 9/1999
WO WO 9948315 9/1999
WO WO 0028762 A1 5/2000
WO WO 0051387 A1 8/2000
WO WO 02/45456 A1 6/2002
WO WO 03039009 A2 5/2003
WO WO 03039009 A3 5/2003
WO WO 03/085992 10/2003
WO WO 03092312 A1 11/2003
WO WO 2004002051 A2 12/2003
WO WO 2004034219 A2 4/2004
WO WO 2004039111 A1 5/2004
WO WO 2005006597 A1 1/2005
WO WO 2005107169 A1 11/2005
WO WO 2005107297 A1 11/2005
WO PCT/US2005/040689 3/2006
WO WO 2005114918 A3 3/2006

OTHER PUBLICATIONS

Ericsson Press release: "Ericsson presents the Mobile@Hometm concept," Mar. 21, 2001, http://www.ericsson.com/press/archiv/2001Q1/20010321-0048.html, printed Jan. 6, 2004, pp. 1-2.
Lindholt et al., "Mobile@Home- a New Use Case for Bluetooth in the Access Network," ISSLS 2002, Apr. 14-18, 2002, Seoul, Korea, www.issls-council.org/proc02/papers/S6A3m.pdf, printed Dec. 8, 2003, 10 pages.
Wu, et al., "Intelligent Handoff for Mobile Wireless Internet, " Mobile Networks and Applications, 6:67-79, 2001.
Perkins, C.E., Simplified Routing for Mobile Computers Using TCP/IP, Wireless LAN Implementation, 1992 Proceeding, IEEE Conference on Sep. 17-18, 1992, pp. 7-13.
Wu et al., "Intelligent Handoff for Mobile Wireless Internet", Mobile Networks and Applications, 6:67-79 (2001).
U.S. Appl. No. 11/004,439, filed Dec. 3, 2004, Gallagher, Michael.
U.S. Appl. No. 11/225,398, filed Sep. 12, 2005, Gallagher, Michael.
U.S. Appl. No. 11/225,870, filed Sep. 12, 2005, Gallagher, Michael.
U.S. Appl. No. 11/225,871, filed Sep. 12, 2005, Gallagher, Michael.
U.S. Appl. No. 11/225,872, filed Sep. 12, 2005, Gallagher, Michael.
U.S. Appl. No. 11/226,610, filed Sep. 13, 2005, Gallagher, Michael.
U.S. Appl. No. 11/226,617, filed Sep. 13, 2005, Gallagher, Michael.
U.S. Appl. No. 11/227,573, filed Sep. 14, 2005, Gallagher, Michael.
U.S. Appl. No. 11/227,784, filed Sep. 14, 2005, Gallagher, Michael.
U.S. Appl. No. 11/227,840, filed Sep. 14, 2005, Gallagher, Michael.
U.S. Appl. No. 11/227,842, filed Sep. 14, 2005, Gallagher, Michael.
U.S. Appl. No. 11/228,853, filed Sep. 15, 2005, Gallagher, Michael.
U.S. Appl. No. 11/229,470, filed Sep. 15, 2005, Gallagher, Michael.
U.S. Appl. No. 11/068,445, filed Feb. 24, 205, Rajeev Gupta et al.
U.S. Appl. No. 11/097,866, filed Mar. 31, 2005, Michael D. Gallagher et al.
U.S. Appl. No. 11/349,024, filed Feb. 6, 2006, Michael D. Gallagher.
U.S. Appl. No. 11/349,025, filed Feb. 6, 2006, Michael D. Gallagher.
Non-Final Office Action of U.S. Appl. No. 11/115,835, Jul. 26, 2007 (mailing date), Mohammed.
Non-Final Office Action of U.S. Appl. No. 10/115,835, May 29, 2008 (mailing date), Mohammed.
International Search Report for PCT/US2003/004485, May 20, 2003 (mailing date), Kineto Wireless, Inc.
"Unlicensed Mobile Access (UMA); Architecture (Stage 2);" UMA Architecture (Stage 2) R1.0.1 (Oct. 8, 2004) Technical Specification, Oct. 8, 2004, 80 pages.

"Digital cellular telecommunications system (Phase2+); Universal Mobile Telecommunications System (UMTS); Mobile radio interface Layer 3 specification; Core network protocols; Stage 3 (3GPP TS 24.008 version 5.6.0 Release 5); ETSI TS 124 008," ETSI Standards, European Telecommunications Standards Institute, Sophia-Antipo, FR, vol. 3-CN1, No. V560, Dec. 2002, pp. 293-317, XP014007949, ISSN: 0000-0001.
"3rd Generation Partnership Project; Technical Specification Group Services and System Aspects; 3GPP System to Wireless Local Area Network (WLAN) Interworking; System Description (Release 6); 3GPP TS 23.234," ETSI Standards, European Telecommunications Standards Institute, Sophia-Antipo, FR, vol. 3-SA, No. V230, Nov. 2003, XP014023920, ISSN: 0000-0001.
U.S. Appl. No. 10/116,311 (Non-Final Office Action), filed Apr. 2, 2002, Jahangir Mohammed.
U.S. Appl. No. 10/115,767 (Non-Final Office Action), filed Apr. 2, 2002, Jahangir Mohammed.
U.S. Appl. No. 10/115,835 (Non-Final Office Action), filed Apr. 2, 2002, Jahangir Mohammed.
U.S. Appl. No. 10/116,186 (Final Office Action), filed Apr. 2, 2002, Jahangir Mohammed.
U.S. Appl. No. 10/251,901 (Non-Final Office Action), filed Sep. 20, 2002, Michael D. Gallagher.
U.S. Appl. No. 11/004,439 (Non-Final Office Action), filed Dec. 3, 2004, Michael D. Gallagher.

* cited by examiner

METHOD FOR AUTHENTICATING ACCESS TO AN UNLICENSED WIRELESS COMMUNICATIONS SYSTEM USING A LICENSED WIRELESS COMMUNICATIONS SYSTEM AUTHENTICATION PROCESS

CLAIM OF BENEFIT TO PRIOR APPLICATIONS

This application is a continuation application of U.S. patent application Ser. No. 09/912,789, entitled "APPARATUS AND METHOD FOR AUTHENTICATING ACCESS TO AN UNLICENSED WIRELESS COMMUNICATIONS SYSTEM USING A LICENSED WIRELESS COMMUNICATION SYSTEM AUTHENTICATION PROCESS," filed Jul. 24, 2001, and now abandoned, U.S. patent application Ser. No. 09/912,789 claims priority to the following provisional patent applications:Nos. 60/271,766; 60/271,767; 60/271,768; and 60/271,769, each of which was filed on Feb. 26, 2001.

BRIEF DESCRIPTION OF THE INVENTION

This invention relates generally to telecommunications. More particularly, this invention relates to a technique for seamlessly integrating voice and data telecommunication services across a licensed wireless system and an unlicensed wireless system.

BACKGROUND OF THE INVENTION

Licensed wireless systems provide mobile wireless communications to individuals using wireless transceivers. Licensed wireless systems refer to public cellular telephone systems and/or Personal Communication Services (PCS) telephone systems. Wireless transceivers include cellular telephones, PCS telephones, wireless-enabled personal digital assistants, wireless modems, and the like.

Licensed wireless systems utilize wireless signal frequencies that are licensed from governments. Large fees are paid for access to these frequencies. Expensive base station equipment is used to support communications on licensed frequencies. Base stations are typically installed approximately a mile apart from one another. As a result, the quality of service (voice quality and speed of data transfer) in wireless systems is considerably inferior to the quality of service afforded by landline (wired) connections. Thus, the user of a licensed wireless system pays relatively high fees for relatively low quality service.

Landline (wired) connections are extensively deployed and generally perform at a lower cost with higher quality voice and higher speed data services. The problem with landline connections is that they constrain the mobility of a user. Traditionally, a physical connection to the landline was required. Currently, unlicensed wireless communication systems are deployed to increase the mobility of an individual using a landline. The mobility range associated with such systems is typically on the order of 100 meters. A common unlicensed wireless communication system includes a base station with a physical connection to a landline. The base station has a RF transceiver to facilitate communication with a wireless handset that is operative within a modest distance of the base station. Thus, this option provides higher quality services at a lower cost, but the services only extend a modest distance from the base station.

Thus, there are significant shortcomings associated with current landline systems and licensed wireless systems. For this reason, individuals commonly have one telephone number for landline communications and one telephone number for licensed wireless communications. This leads to additional expense and inconvenience for an individual. It would be highly desirable if an individual could utilize a single telephone number for both landline communications and licensed wireless communications. Ideally, such a system would allow an individual, through seamless handoffs between the two systems, to exploit the benefits of each system.

SUMMARY OF THE INVENTION

A method of authenticating a user seeking access to an unlicensed wireless communication system includes delivering to an unlicensed wireless communication subscriber device licensed wireless communication system security information. An authentication result produced by the subscriber device is processed in response to the licensed wireless communication system security information. The authentication result is compared with an authentication value to selectively produce an authentication command. Unlicensed wireless communication between the subscriber device and an unlicensed wireless communication system base station is enabled in response to the authentication command.

Advantageously, services that would typically be provided via a licensed wireless system can be delivered to the unlicensed base station using inexpensive and high quality landline networks. The unlicensed base station subsequently provides service to a handset using unlicensed, free spectrum (e.g., spectrum around 2.4 GHz or 5 GHz). Thus, when a subscriber is within range of the unlicensed base station, the subscriber enjoys low cost, high speed, and high quality voice and data services. In addition, the subscriber enjoys extended service range since the handset can receive services deep within a building. This type of service range is not reliably provided by a licensed wireless system.

The invention also allows the subscriber to roam outside the range of the unlicensed base station without dropping communications. Instead, roaming outside the range of the unlicensed base station results in a seamless handoff (also referred to as a hand over) wherein communication services are automatically provided by the licensed wireless system.

While the invention provides advantages to the subscriber, the invention also provides advantages to the wireless system service provider. First, the unlicensed base stations are relatively low cost and therefore the wireless system service provider is in a position to extend services without incurring significant infrastructure expense. Further, the integration of the landline and wireless systems allows a single communication service provider to secure fee-paying accounts for both landline and wireless services. Finally, since the invention relies upon installed wireless system infrastructure for services such as authentication, expensive system upgrades are not required.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
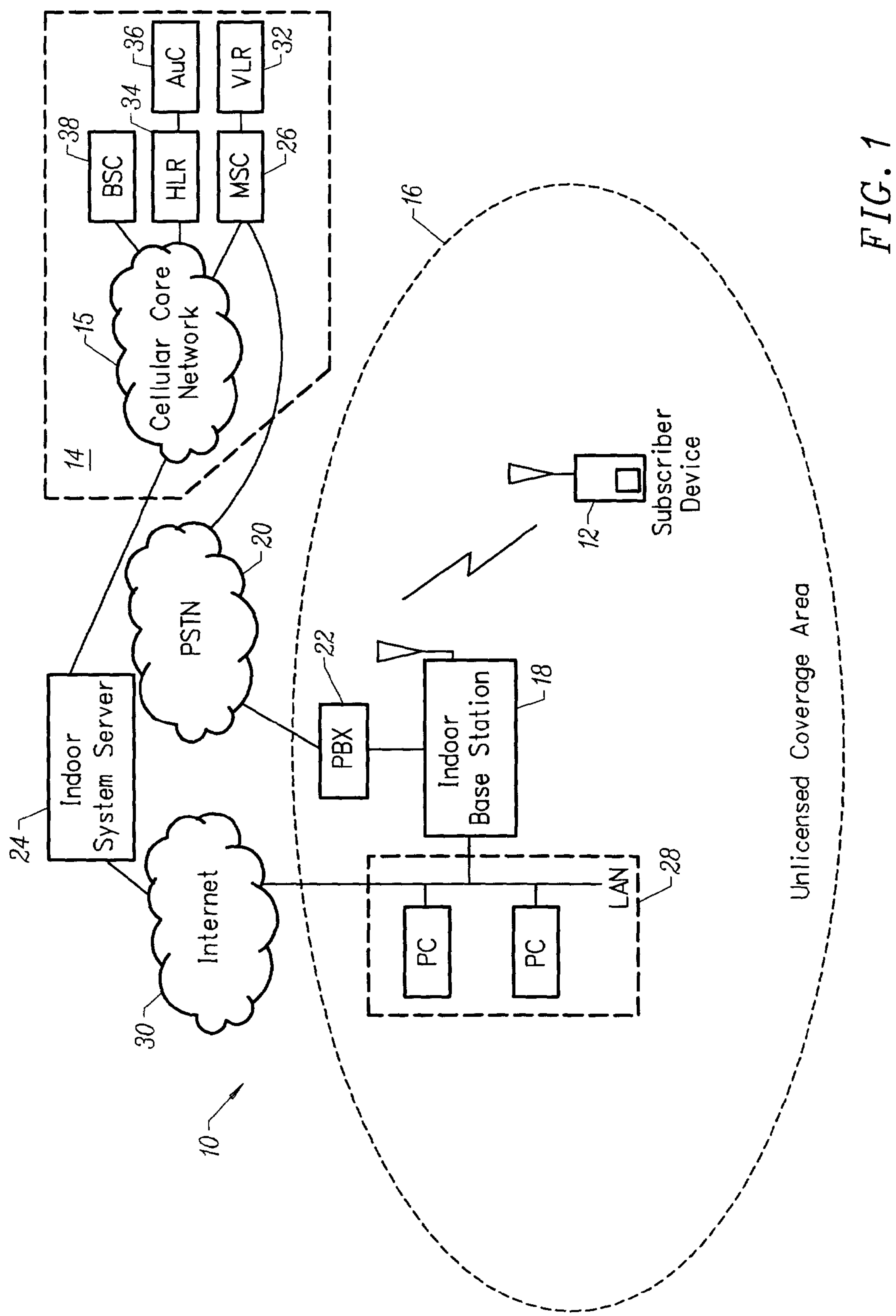
FIG. 1 illustrates an apparatus for integrating a licensed wireless system and an unlicensed wireless system in accordance with an embodiment of the invention.

FIG. 1 illustrates a system 10 that may be operated in accordance with an embodiment of the present invention. The system 10 includes a subscriber device 12, which is a wireless transceiver, such as a cellular telephone, a PCS telephone, a wireless data modem, a wireless enabled Personal Digital Assistant, a wireless enabled computer, and the like. This subscriber device 12 is in wireless electronic communication with a licensed wireless communication service that provides voice and/or data services. By way of example, the invention is disclosed in connection with a licensed wireless communication service in the form of a cellular network 14. When the subscriber device 12 is within an unlicensed wireless service coverage area 16, the licensed wireless service is substituted, without interruption, with an unlicensed wireless service that is facilitated through a base station 18.

The base station 18 wirelessly transmits telephone signals from a standard Public Switched Telephone Network (PSTN) 20 and, if necessary, a standard Private Base eXchange (PBX) 22, to a subscriber device 12. Specifically, when a device 12 is within an unlicensed wireless service coverage area 16, the originating base station 18 provides the device 12 with wireless telephone service originating from a PSTN 20 rather than a cellular network 14. Since the PSTN 20 is used, the subscriber device 12 receives high quality voice or data services at a relatively low cost. If the user of the subscriber device 12 roams outside of the unlicensed wireless service coverage area 16, the same communication session can be maintained without interruption by transitioning to the licensed wireless service provided by the cellular network 14. Techniques for implementing seamless transitions of this type are discussed in detail below.

A system server 24 facilitates seamless transitions between the licensed wireless service and the unlicensed wireless service. The system server 24 is in electronic communication with the standard cellular network 14. In one embodiment of the invention as shown in FIG. 1, the system server 24 is also in electronic communication with the base station 18 through a Local Area Network (LAN) 28 and a larger network 30, such as the Internet. The system server 24 and the base station 18 may be linked through any number of communication services, including Digital Subscriber Line (DSL), cable, satellite, and the like.

FIG. 1 illustrates that the cellular network 14 includes standard components, such as a cellular core network 15, a Mobile Switching Center (MSC) 26, Visitor Location Register (VLR) 32, a Home Location Register (HLR) 34, an Authentication Center (AC) 38, and a Base Station Controller (BSC) 38. As discussed below, these standard components are utilized in a novel manner in order to provide extended functionality for a subscriber device 12.

Figure 2:
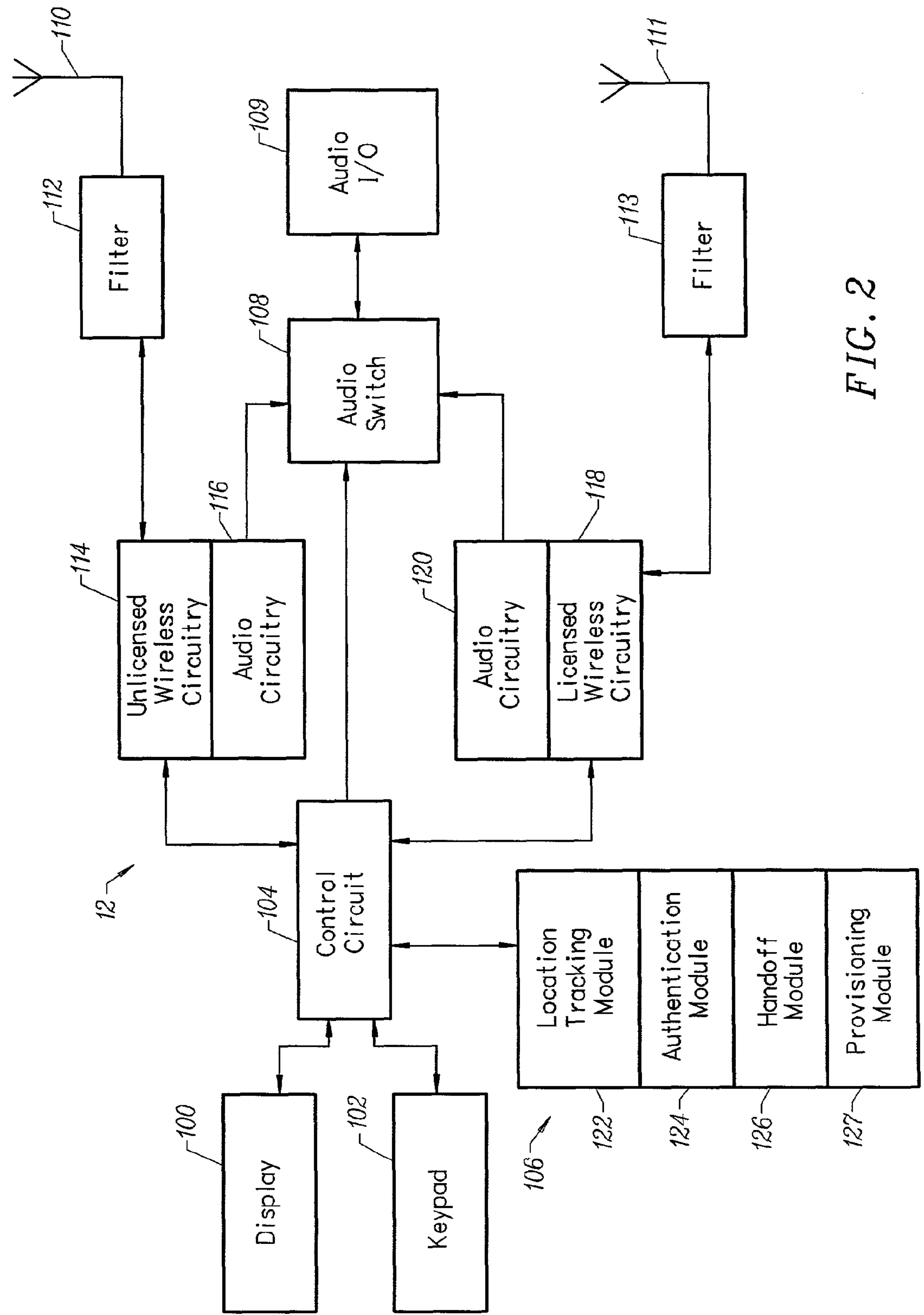
FIG. 2 illustrates a subscriber device configured in accordance with an embodiment of the invention.

FIG. 2 illustrates a subscriber device 12. As previously indicated, the subscriber device 12 may be a wireless telephone or a wireless modem. In the case of a wireless telephone, the subscriber device 12 includes a display 100, keypad 102, and a control circuit 104. The display 100 may be used to provide a visual indication to a user when the subscriber device 12 is within the service range of the base station 18. The keypad 102 is used in a conventional manner. The control circuit 104 may be in the form of a processor, a hardwired circuit, a programmable logic device, an application specific integrated circuit, and the like.

The control circuit 104 is also connected to a memory module 106 and, via audio switch 108, to an audio input/output circuit 109. Wireless signals in the unlicensed spectrum are received by, an antenna 110 and are filtered by a filter 112 to improve signal clarity and/or strength. The wireless signals are then processed by unlicensed wireless circuitry 114, which is also referred to as unlicensed wireless communication signal processing circuitry. The unlicensed wireless circuitry operates as a standard transceiver for processing unlicensed wireless signals. The circuitry 114 may support any number of unlicensed wireless standards. For example, currently in the U.S., unlicensed wireless signals may be sent at frequencies around 900 MHz, 2.4 GHz, or 5 GHz. Unlicensed wireless communication may be implemented in accordance with the invention utilizing any number of unlicensed spectrum communications protocols, including Bluetooth, IEEE 802.11a, IEEE 802.11b, and Hyper-LAN. Advantageously, many licensed wireless subscriber devices are currently being configured to include unlicensed wireless circuitry for such applications as remote microphones and speakers. In accordance with the invention, this circuitry is used for a new application, namely, communicating with a base station, as discussed below.

Selected signals, such as location update data or signal strength data, are sent to the control circuit 104. Audio data is converted to an audio signal by audio circuitry 116 and is sent to an audio switch 108 for broadcast by an audio input/output circuit 109. Audio signals transmitted to the audio input/output circuit 109 are transmitted by audio switch 108 to the control circuit 104, which is capable of sending audio and other data to unlicensed wireless circuitry 114. Unlicensed spectrum signals are then sent through the filter 112 and on to the antenna 110, where they are broadcast to the base station 18.

In similar manner, wireless signals from a licensed cellular network 14 are transmitted to the antenna 111, filtered by the filter 113, and are then processed by the licensed wireless circuitry 118, also referred to as licensed wireless communication signal processing circuitry. These signals are subsequently converted to an audio signal by audio circuitry 120 or are processed by control circuit 104. As above, signals originating from the device 12 can also be sent out, but here the destination is a licensed wireless communication network (e.g., cellular network 14) rather than a base station 18. In the event of a data modem, the audio input/output circuit 109 is omitted and a data source is applied directly to the control circuit 104. Audio signals transmitted from the audio input 109 are transmitted by audio switch 108 to the control circuit 104, which is capable of sending audio and other data to licensed wireless circuitry 118. Wireless signals are then sent through the filter 113 to the antenna 111, where they are broadcast to the licensed wireless network 14.

The individual subscriber device components discussed up to this point are standard. The combination of these devices is believed to be novel, as is the operation of these devices in accordance with a set of executable programs stored in memory 106. The executable programs within memory 106 are shown by way of example. The same functionality may be realized through hardwired circuits, application specific integrated circuits, programmable logic devices, and the like. Indeed, the various components of the subscriber device 12 may be combined or integrated in any number of ways. The embodiment of FIG. 2 is for the purpose of illustration.

The executable programs reside on top of standard licensed wireless system call processing software. In addition, the programs reside on top of standard unlicensed wireless link protocol software (e.g., standard Bluetooth or 802.11b software). The programs bridge these systems by exchanging messages between the separate software stacks. Advantageously, this approach allows a large portion of the existing software protocols in the subscriber device 12 to be reused without any changes.

The memory module 106 contains a location tracking module 122 that records the current location of the device 12 (i.e., whether the device is within an unlicensed coverage area 16). In addition, the module 106 contains an authentication and authorization module 124 to coordinate an authentication procedure for validating that the device 12 is licensed for use within the unlicensed coverage area 16. As discussed below, the invention utilizes the authentication infrastructure associated with the licensed wireless system to authenticate and authorize a subscriber device for unlicensed wireless system services. The memory 106 also includes a handoff module 126 to coordinate seamless service exchanges between a base station 18 supporting unlicensed wireless communications and a licensed wireless communications network, such as a cellular network 14. The operations associated with each of the modules stored in memory 106 are discussed in further detail below.

Figure 3:
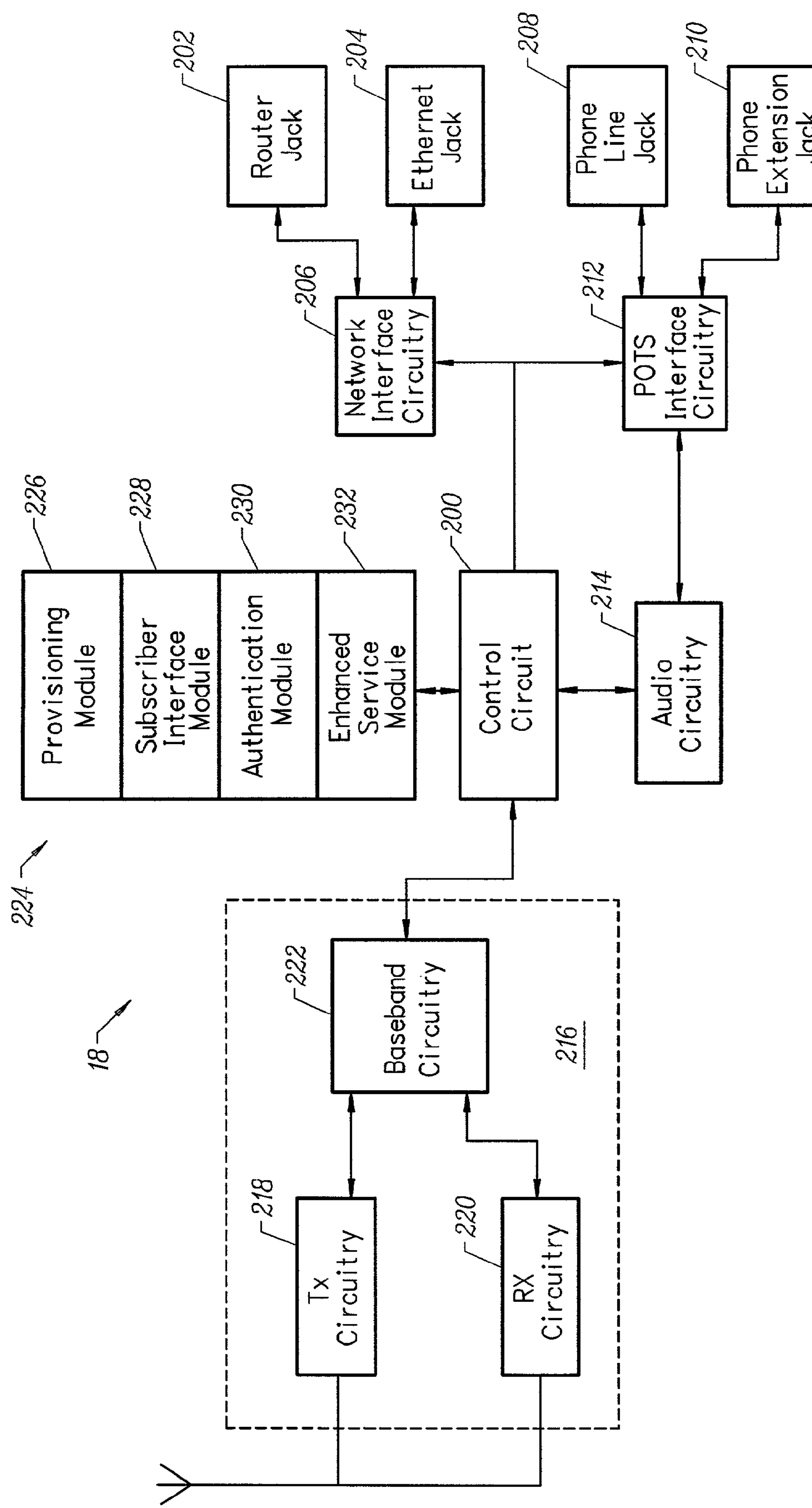
FIG. 3 illustrates a base station configured in accordance with an embodiment of the invention.

FIG. 3 illustrates an embodiment of a base station 18 in accordance with an embodiment of the present invention. When the subscriber device 12 is within the coverage area 16 of the base station 18, the base station 18 can be used to provide the subscriber device 12 with landline quality data and voice service via an unlicensed wireless communication link. In particular, the base station 18 interconnects to the existing telephone network to provide a final link to a subscriber device 12 through a short-range two-way radio link.

In one embodiment of the invention, the base station 18 is controlled by a control circuit 200, which is in communication with the LAN 28 and therefore the system server 24 via router jack 202 and/or Ethernet jack 204. The control circuit 200 may be a processor, a hardwired circuit, a programmable logic device, an application specific integrated circuit and the like. Signals from the system server 24 travel through one of these jacks into network interface circuitry 206 and on to the control circuit 200. This allows the base station 18 to communicate with the system server 24. As discussed below, the server 24 determines whether and when to route phone service over the unlicensed wireless system (e.g., via the PSTN 20 and base station 18) or the licensed wireless system (e.g., via cellular network 14).

The control circuit 200 is also in communication with a landline (PSTN 20 and, in the typical business context, PBX 22) via a phone line jack 208 and/or phone extension jack 210. These jacks transmit information between the PSTN 20 and control circuit 200 through Plain Old Telephone Service (POTS) interface circuitry 212. Audio data is translated by audio circuitry 214, while other data can be directly exchanged with the control circuit 200.

The base station 18 communicates wirelessly with devices 12 using a radio frequency circuit 216. This circuit 216 includes standard circuitry to receive and transmit electronic voice and/or data in an unlicensed wireless signal format. For example, currently in the U.S., unlicensed wireless signals may be sent in the frequency range between 2.4 GHz and 5 GHz. Unlicensed wireless communication may be implemented in accordance with the invention utilizing any number of unlicensed spectrum communications protocols, including Bluetooth, IEEE 802.11a, IEEE 802.11b, and Hyper-LAN.

A typical circuit 216 consists of transmission circuitry 218 for transmitting signals to a device 12, receiving circuitry 220 for receiving signals from the device 12, and base band circuitry 222. The baseband circuitry 222 contains standard circuitry for down converting unlicensed wireless signals to base band signals, which allows for the extraction of relevant information by the control circuit 200. The base band circuitry 222 also contains standard circuitry for up converting base band data from the control circuit 200 to unlicensed wireless signals for broadcast by transmission circuitry 218.

The control circuit 200 is also connected to a memory module 224. The memory module 224 contains a provisioning module 226 that is used to facilitate the initial configuration and servicing of the base station 18 and subscriber device 12. The module 224 also includes a subscriber interface module 228. The subscriber interface module 228 instructs the control circuit 200 to periodically broadcast a signal (e.g., an unlicensed wireless communication base station identification signal). If a subscriber device 12 responds to the signal, then the base station 18 knows that the subscriber device 12 is within the unlicensed coverage area 16. The module 224 also contains an authentication module 230 to coordinate the authentication of a subscriber device 12 that has entered the unlicensed coverage area 16. In one embodiment of the invention, the memory 224 includes an enhanced service module 232. The enhanced service module may be used to provide improved services to a subscriber device. For example, if the user of a subscriber device is playing a low latency on-line game, different screen displays can be cached in the base station 18 and then be quickly downloaded to the subscriber device 12. Each of the modules stored in memory 224 can also be implemented as hardwired circuits, application specific integrated circuits, programmable logic devices, and the like.

The enhanced service module 232 may also be used to implement other advanced features. For example, the enhanced service module 232 can be configured to append a set of prefix digits before dialed digits to instruct the server 24 to route long distance calls on a specific service provider network.

The enhanced service module 232 can also be used to simultaneously support multiple subscribers. For example, the base station 18 may support multiple subscriber devices through a single or multiple landline connections.

Preferably, the subscriber interface module 228 of the base station 18 is configured to advise a subscriber device when the landline associated with the base station 18 is occupied. In such a case, the handoff module 126 of the subscriber device will no longer attempt to make contact with the base station 18, but will continue to utilize the licensed wireless system for call servicing.

Figure 4A:
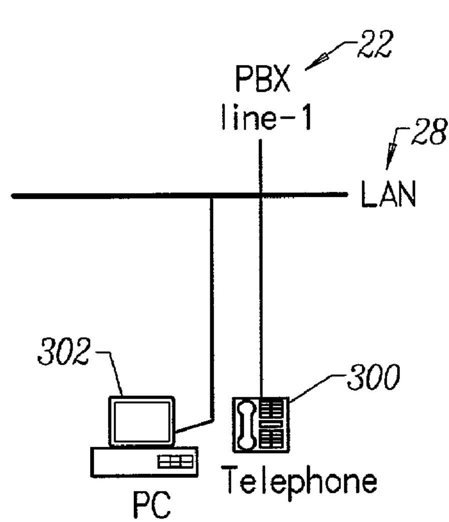
FIGS. 4A-4D illustrate various base station configurations utilized in accordance with embodiments of the invention.

In order to provide landline-quality service to subscriber devices 12, a base station 18 is installed directly in the path of a typical phone system. FIG. 4A illustrates a typical office or workplace, where a telephone 300 is connected to a PBX 22. The PBX 22 is installed between the telephone 300 and PSTN 20 to provide a private telephone network in which a number of telephones 300 share a certain number of outside lines from the PSTN 20. FIG. 4A illustrates that a Personal Computer (PC) 302 can be connected to the LAN 28 for communication with the Internet 30.

Figure 4B:
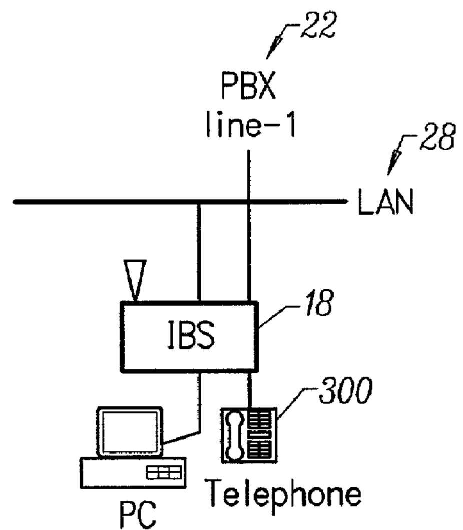

FIG. 4B illustrates the workplace environment of FIG. 4A modified to incorporate the base station 18 of the invention. The base station 18 is placed in electronic communication with both the telephone 300 (e.g., via phone line jack 208) and the LAN 28 (e.g., via Ethernet jack 204). This configuration allows base station 18 to receive landline voice and data from a PSTN 20 and broadcast it to subscriber devices 12 when they are within the coverage area 16. The base station 18 is also connected to a LAN 28, which allows it to communicate with the system server 24 in order to coordinate handoffs between the licensed wireless and unlicensed wireless systems. Advantageously, the base station 18 operates transparently with respect to the PBX 22, the LAN 28, the telephone 300, and the PC 302. In the event that the PBX 22 is Internet Protocol based, the base station 18 can be connected solely to the LAN 28.

Figure 4C:
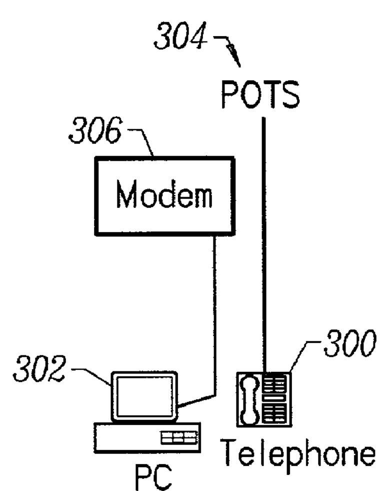
Figure 4D:
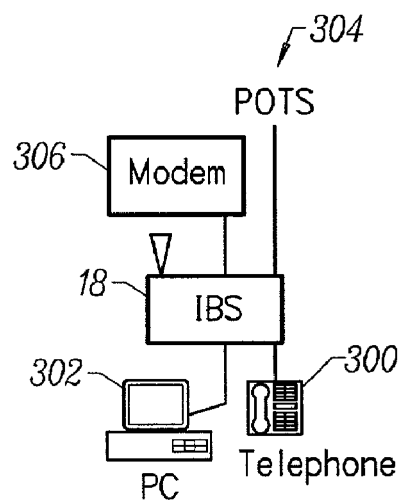

FIG. 4C illustrates a typical home setting, which is usually similar to the workplace setting of FIG. 4A minus the LAN 28 and PBX 22. The telephone 300 is ordinarily connected directly with Plain Old Telephone Service (POTS) 304, which is simply another term for PSTN 20. Connection to the Internet 30 is provided by a modem 306 in communication with a PC 302. FIG. 4D illustrates the placement of base station 18 within this typical home setting. Here, the base station 18 is placed in electronic communication with both a telephone 300 and modem 306, allowing it to communicate directly with the POTS 304/PSTN 20 and, through modem 306, with the Internet 30 and system server 24. Once again, the base station 18 operates transparently with respect to the modem 306, the POTS 304, the telephone 300, and the PC 302.

In both the workplace and home settings, the base station 18 can be in simultaneous communication with both a telephone landline and a system server 24. When a subscriber device 12 roams inside the coverage area 16, the base station 18 can thus provide landline-quality service to device 12. The invention should thus be construed to include an apparatus and method for the seamless switching of telephone service between a cellular network 14 and a landline-based base station 18 that can be used in either a residential or commercial setting.

As mentioned above, for purposes of this invention a landline can be interchangeably referred to as a POTS 304 or PSTN 20. However, the invention should not be construed as limited to simply the POTS or PSTN context. Rather, the invention discloses a base station 18 that can provide landline-quality service to a subscriber device 12 by communicating with any landline network. Examples of such networks include, but are not limited to, DSL, cable or cable modem networks.

Figure 5:
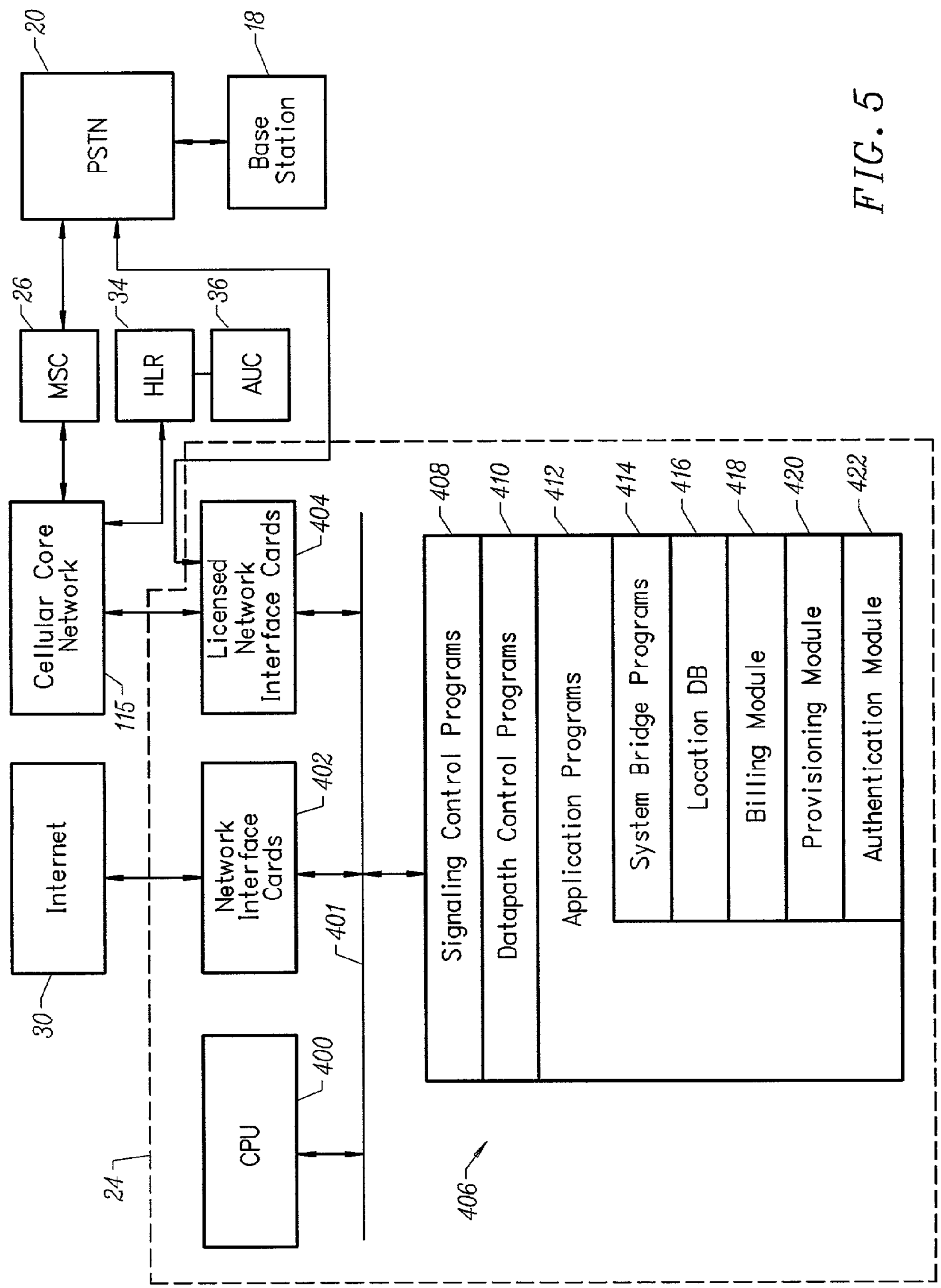
FIG. 5 illustrates a system server for integrating unlicensed and licensed wireless communication systems in accordance with an embodiment of the invention.

FIG. 5 illustrates a system server 24, which manages the mobility of subscriber devices 12 between a landline-based unlicensed wireless service from a base station 18 and a licensed wireless service, such as from a cellular network 14. A typical system server 24 is controlled by a central processing unit (CPU) 400, which is connected to a bus 401. Network interface cards 402 (e.g., Ethernet cards) for communicating with the Internet 30 are also connected to the bus 401. Licensed network interface cards 404 (e.g., SS7 cards) for communicating with cellular networks 14 are also connected to the bus 401. This allows the system server 24 to use Internet Protocol (IP) and/or SS7 protocol and/or MAP & IS-41 protocols to connect to the Internet and cellular core networks.

The system server 24 also contains a memory module 406 that stores a number of programs, databases and other assorted modules. More specifically, the module 406 contains signaling control programs 408. The signaling control programs 408 are standard programs for establishing communications with the licensed wireless network. Therefore, for example, the signaling control programs 408 may include a Transaction Capability Application Part (TCAP) module, a Message Transfer Part (MTP) module, and an Interim Standard (IS41) module to support Time Division Multiple Access (TDMA) and Code Division Multiple Access (CDMA). Memory 46 may also store datapath control programs 410. By way of example, the datapath control programs may include standard programs to facilitate computer network data transfers. By way of example, the datapath control programs may include an Internet Protocol (IP) module and a Gateway Tunnel Protocol (GTP) module.

The memory 406 also stores various system server application programs 412. These application programs include system bridge programs 414 for handling transitions in service from licensed to unlicensed wireless services and vice versa. The memory 406 also stores a location database 416 for storing the current location of devices 12 and indicating whether they are within the coverage area 16. Also included is a billing module 418 for recording usage statistics for billing purposes. The billing module 418 distinguishes between charges for licensed wireless services and unlicensed wireless services. A provisioning module 420 is included to facilitate the installation of new base stations. An authentication module 422 is used to facilitate the authentication of a subscriber device within an unlicensed wireless service area. As discussed below, the authentication module 422 includes data and executable instructions to emulate certain components of a licensed wireless network. For example, the authentication module emulates a mobile switching center during the authentication process.

The major components of the invention—the subscriber device 12, the base station 18, and the system server 24—have now been described. The operations of these devices are more fully appreciated with the following discussion.

Figure 6:
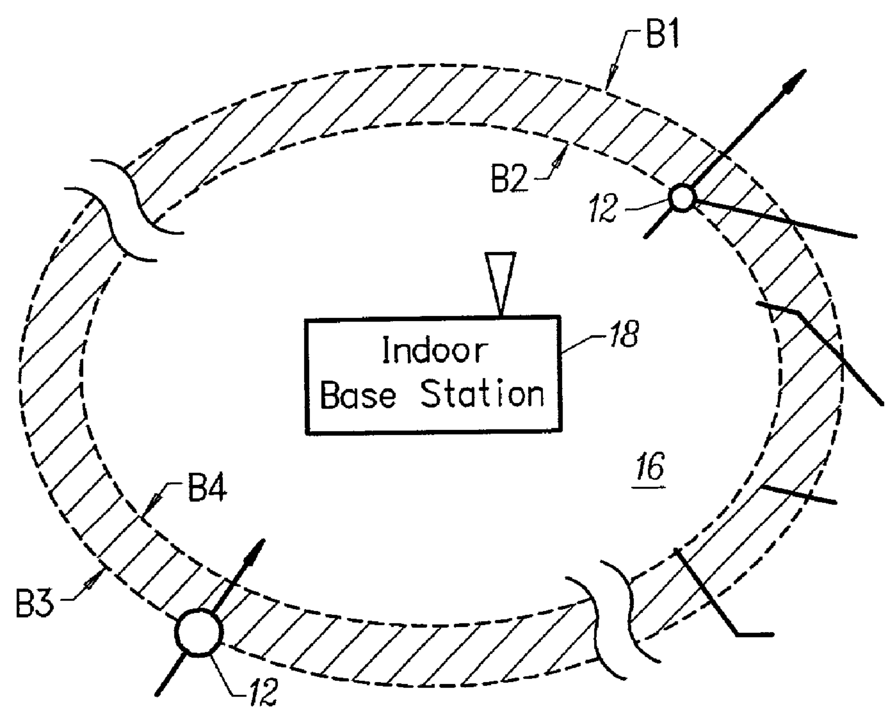
FIG. 6 illustrates a base station service region and associated transition points between licensed and unlicensed wireless communication services.

The invention's facilitation of seamless transitions between licensed and unlicensed wireless services is more fully appreciated in connection with FIG. 6. Base station 18 broadcasts within a set of boundaries B1, B2, B3 and B4. A subscriber device 12 located outside these boundaries is serviced by a licensed wireless system, such as a standard cellular network 14. However, once the device 12 crosses boundary B3, the handoff from the licensed wireless service to the unlicensed wireless service begins. That is, at the B3 boundary the base station 18 is able to recognize the presence of the subscriber device 12. As previously indicated, the base station 18 includes a subscriber interface module 228 that coordinates the transmission of a service range signal that is identified by a subscriber device 12. That is, the location tracking module 122 of the subscriber device 12 is used to coordinate the identification of a base station signal. In the presence of such a signal, the location tracking module 122 coordinates the transmittal of an acknowledgment signal to the base station 18.

Preferably, the subscriber interface module 228 of the base station 18 identifies the boundary points of the service area 16 by using the received signal strength and the transmit-power level setting from the subscriber device 12. In particular, an automated process is preferably used to learn the boundary distances through heuristically measuring the success rate and adjusting the boundary distance for optimal handoff success rates.

In one embodiment, the location tracking module 122 of the subscriber device 12 is implemented to periodically wake the unlicensed wireless circuitry 114 to sniff and thereby determine whether it is within the range of a base station. If so, the subscriber device registers with the base station 18, if not, the unlicensed wireless circuitry 114 is activated at a later time.

Under the control of the subscriber interface module 228, the base station 18 identifies the acknowledgement signal and transmits a subscriber device present signal to the router jack 202, the Ethernet jack 204, the phone line jack 208, or the phone extension jack 210. The subscriber device present signal is subsequently directed through a network (e.g., the LAN 28 and Internet 30) to the system server 24, which notes that the subscriber device 12 is now within the service area of the base station 18. In particular, the system server 24 logs this information in the location database 416.

Once the system server 24 logs the fact that the subscriber device 12 is within the service range of the base station 18, it contacts the cellular network 14 to initiate a call to the landline associated with the base station 18. It is known in the art to utilize a cellular network 14 to establish a call to a landline number. For example, FIG. 1 illustrates a link between the Mobile Switch Center (MSC) 26 and the PSTN 22. In the prior art, this feature is used to direct a call intended for a mobile device to a landline telephone when the user of the mobile device has advised the cellular system that the landline telephone can be used to receive calls. Observe in this situation that the transition from the cellular network to the landline telephone is established prior to the call being placed. This prior art scenario stands in sharp contrast to the present invention where during the course of an already established communication session control is transferred from a licensed wireless service to an unlicensed wireless service or vice versa. This aspect of the invention is more fully appreciated in connection with the following discussion.

As previously indicated, when the subscriber device 12 crosses the boundary B3, a landline call to or from the base station 18 is initiated. Once the landline call is received at the base station 18, the base station 18 begins transmitting to the subscriber device 12 using the unlicensed wireless spectrum. These transmissions are processed by the unlicensed wireless circuitry 114 of the subscriber device 12 (See FIG. 2). At this point, the licensed wireless circuitry 118 is also active and the audio switch 108 is responsive to the licensed wireless circuitry 118. Thus, the subscriber device 12 is processing both licensed wireless signals and unlicensed wireless signals at this point. The handoff module 126 can coordinate this operation.

The subscriber interface module 228 of the base station 18 continues to monitor the signal strength from the subscriber device 12. When the signal strength reaches a threshold corresponding to the crossing of boundary B4, the subscriber interface module 228 initiates a handoff command, which is applied to the RF circuit 216. The handoff command is received at the subscriber device 12 and is processed by the handoff module 126, which generates a handoff signal that is applied to the audio switch 108. The handoff signal causes the audio switch 108 to process information from the audio circuitry 116 associated with the unlicensed wireless circuitry 114.

At this point, the licensed wireless circuitry 118 can be turned off. The ability to turn this circuitry off is a significant advantage because it preserves battery life. Typically, the licensed wireless circuitry remains active in order to provide location information to the licensed wireless system infrastructure. However, as discussed below, this location information is available in accordance with the invention. Therefore, the licensed wireless circuitry can be shut down to obtain a significant extension in battery life. Alternately, the licensed wireless circuitry 118 can remain in a low power state to receive signaling or messages from the licensed wireless system, while voice is carried over the unlicensed system.

The spacing between boundaries B3 and B4 allows time for the establishment of simultaneous connections between the subscriber device 12 and both the licensed network and unlicensed network. This allows for the immediate switching of service to the unlicensed network once the subscriber device 12 crosses boundary B4, thus creating a seamless transition to base station service that is transparent to the user.

Once the device 12 is within boundary B4, service is originated within the PSTN 20 and broadcast wirelessly to the device 12 by the base station 18. If the device 12 travels away from this base station 18, service is handed off from the base station 18 to a licensed wireless network 14 in a manner similar to the process described above. Specifically, once the device 12 crosses boundary B2, a simultaneous link is established with a licensed wireless network (e.g., cellular network 14). When the device 12 further crosses boundary B1, a seamless handoff is made from the unlicensed wireless service originating over the PSTN 20 to the licensed wireless network (e.g., cellular network 14). At this point, the subscriber device 12 receives wireless services from the cellular network 14 in a standard manner.

Figure 7:
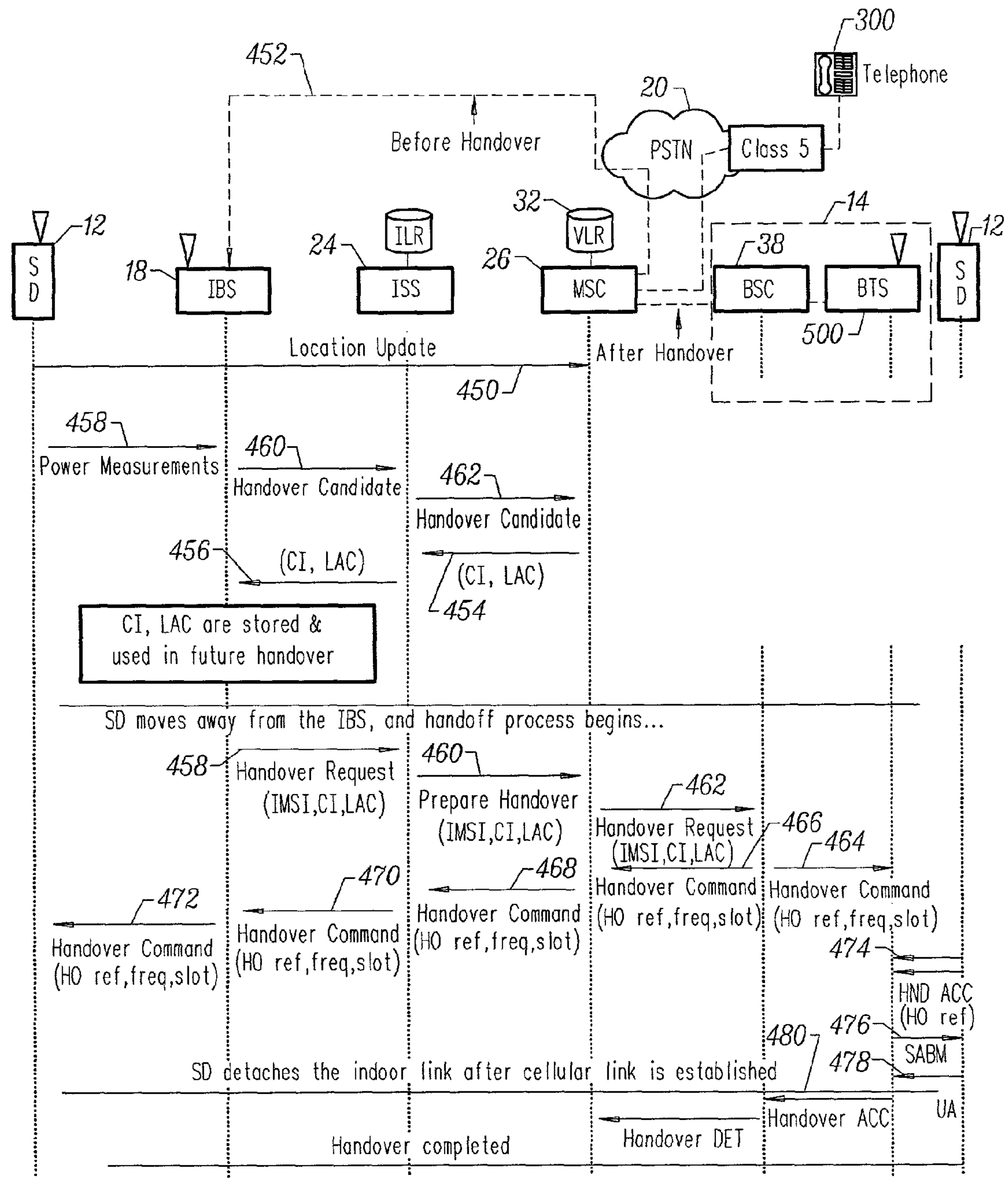
FIG. 7 illustrates a transition between an unlicensed wireless service and a licensed wireless service in accordance with an embodiment of the invention.

FIG. 7 provides a more detailed characterization of this handoff process from an unlicensed wireless service to a licensed wireless service. When the subscriber device 12 is within the service area 16 of the base station 18, the subscriber device 12 transmits to the base station 18 information on the signal strengths of the frequencies of the nearby licensed wireless base stations. The base station 18 forwards this information to the system server 24, which in turn sends the information to the Visitor Location Register (VLR) 32. This operation is shown with arrow 450 in FIG. 7.

In response to this message, the licensed wireless system provides the parameters that are needed when the subscriber device 12 needs a handoff from the unlicensed wireless system to the licensed wireless system. This information includes the identity of the base station to which the handoff should be made. By way of example, in a GSM cellular system, these parameters are CI (Cell Identity) and LAC (Location Area Code). This handoff information may be obtained and stored in the base station 18 before a call is made or when a call is made. In any event, the handoff information can be secured well before the subscriber device 12 roams outside the coverage area of the base station 18. The availability of this information allows the subscriber device 12 to quickly transition to the licensed wireless system. In addition, this information allows the licensed wireless circuitry 118 to be shut down for the purpose of extending battery life.

The licensed wireless system connection information may be delivered to the base station 18 via a landline connection as shown with line 452. Alternately, the information may be delivered through a communication session between the system server 24 and the mobile switch center 26 and then the system server 24 and the base station 18, as shown with arrows 454 and 456.

As shown with arrow 458 in FIG. 7, the base station 18 continuously makes power measurements of signals that are received from the subscriber device 12. When the power measurements begin to grow weak, the base station may notify the system server 24 to initiate a handoff to the licensed wireless system. In turn, the system server 24 may advise the Mobile Switch Center (MSC) 26 of the hand over candidate, as shown with arrows 460 and 462.

When the power measurements at the base station 18 become sufficiently weak, indicating that the subscriber device 12 is moving away from the base station 18 (e.g., crossing boundary B2) a formal hand over request is initiated. In particular, the base station 18 transmits to the system server 24 the base station identity (e.g., CI, LAC, etc.) to which the handoff should be transferred, as shown with arrow 458. The system server 24 contacts the MSC 26 to initiate a handoff, as shown with arrow 460. The MSC 26 contacts the Base Station Controller (BSC) 38, as shown with arrow 462. In response, the BSC 38 generates a channel number, a slot number and a handoff reference. As shown with arrow 464, this information is passed to the Base Station Transceiver System (BTS) 500. The information is also passed back to the subscriber device 12 through the MSC 26, the system server 24, and the base station 18, as shown with arrows 466, 468, 470, and 472.

In response to this information, the BTS 500 turns on a transmitter and receiver at the specified channel number and slot number. Similarly, the subscriber device 12 turns on its transceiver circuitry 118. The BTS 500 seeks a response from the subscriber device with a matching reference number, as shown with arrow 474. Once the subscriber device 12 receives the BTS transmission, it sends a message to the BTS with the handoff reference, as shown with arrow 476. At this point, a new licensed wireless link is established on the given channel and slot number, as shown with arrow 478. Once the licensed wireless link is established, the unlicensed wireless link is turned off, as shown with line 480 in FIG. 7. Thereafter, the BTS 500, the BSC 38, and the MSC 26 operate in a standard manner to supply licensed wireless services to the subscriber device 12. The foregoing operations may be implemented using the handoff module 126 of the subscriber device 12, the subscriber interface module 228 of the base station 18, and the system bridge programs 414 of the system server 24.

As previously indicated, a handoff from a licensed wireless service to an unlicensed wireless service occurs in a similar but reverse fashion. When the subscriber devices 12 cross boundary B3 from a remote location the base station 18 initiates a handoff operation by sending a request to the system server 24, which conveys the request to the MSC 26. The MSC 26 then hands off the call to the landline number assigned to the base station 18.

Between boundaries B3 and B4, both the licensed wireless (e.g., cellular) link and unlicensed wireless (e.g., landline originated) link are simultaneously active. After a period in which both links are simultaneously active, control of the communication session is switched from the licensed wireless circuitry 118 to the unlicensed wireless circuitry 114. The handoff module 126 may coordinate this handoff in response to a handoff command initiated at the subscriber interface module 228 of the base station 18. As above, the maintenance of simultaneous licensed and unlicensed wireless links for a period of time ensures a successful seamless handoff. This reduces the number of dropped calls, and allows for successful handoffs even when the signaling messages among different elements of the cellular and landline-based systems experience delays or latency.

The foregoing discussion was directed toward handoffs between licensed wireless services and unlicensed wireless services. The invention also includes a technique for seamless handoffs between unlicensed wireless service base stations. Such a technique would be valuable, for example, in the case where an office building has a large number of base stations 18 to supply unlicensed wireless services to a user that would otherwise receive poor quality licensed wireless service within the office building.

Thus, the invention includes a system wherein a plurality of base stations 18 exist with overlapping coverage areas 16. This allows a subscriber device 12 to roam freely among the coverage areas 16.

Figure 8:
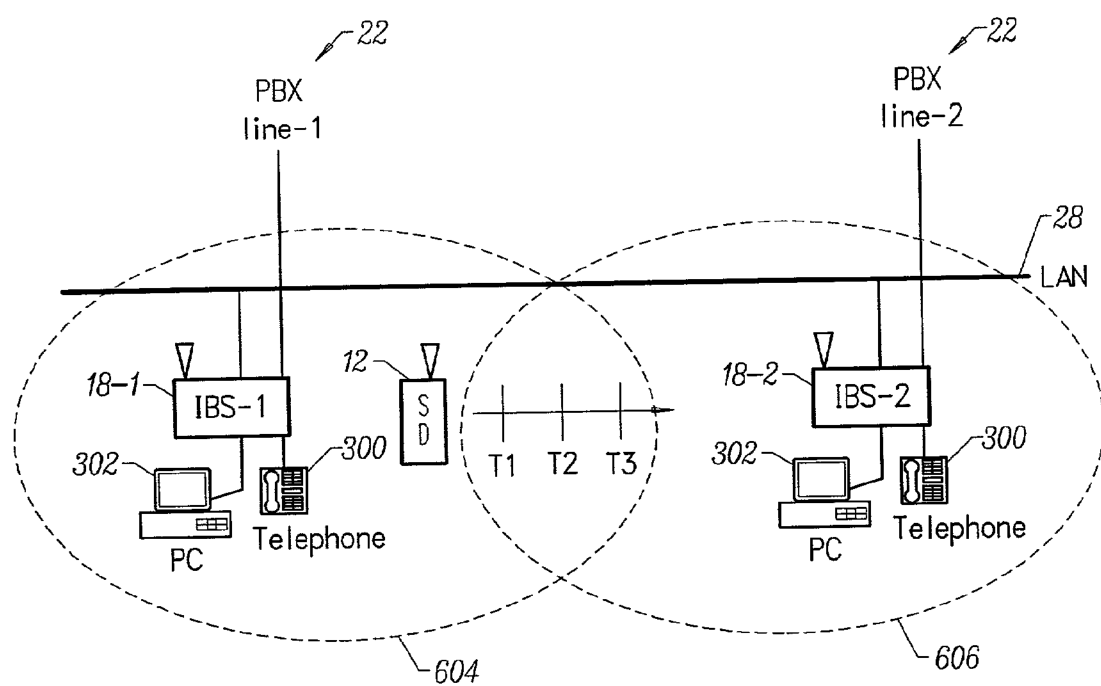
FIG. 8 illustrates transitions between unlicensed wireless base stations in accordance with an embodiment of the invention.

FIG. 8 illustrates such a system. The subscriber device 12 is registered with base stations 18-1 and 18-2. Base stations 18-1 and 18-2 communicate with each other using LAN 28. The base stations 18-1 and 18-2 are shown installed in a typical workplace setting, with telephones 300 and PCs 302 connected to a LAN 28 and PBX 22 in a standard fashion. Note that the coverage areas 604 and 606 of the base stations 18-2 and 18-2 overlap. As a device 12 moves from one area 604 to another area 606, voice and data signals from the first base station 18-1 are seamlessly handed off to the second base station 18-2.

Periodically, the base stations 18-1 and 18-2 broadcast a message over the LAN 28 to all other base stations connected to the LAN 28. This message includes a time stamp, a signal indicating the particular base station, the subscriber number, and a range number indicating the distance between that base station and the device 12. A separate message is broadcast for each base station on the LAN 28. A range number can be calculated by relying upon the ability of the base station 18 to measure the signal strengths emitted from the subscriber device or vice versa.

In accordance with this feature of the invention, there is no centralized control mechanism for handling handoffs. Instead, the subscriber interface module 228 of each base station 18 is used to coordinate handoffs between base stations based upon signal strengths and/or range numbers. For example, in FIG. 8, at position T1 the base station 18-1 would transmit a time stamp, a base station number, a subscriber number, and a range number indicating that the subscriber device 12 is relatively close to the base station 18-1. At T2 the base station 18-1 would transmit the same information except a different range number indicating that the signal between the base station 18-1 and the subscriber device 12 is weaker. By position T3, the base station 18-2 would send a signal on the LAN 28 indicating that it has a range number indicating that the subscriber device 12 is now closer to it than to base station 18-1. Accordingly, both base stations would recognize that a transition from base station 18-1 to base station 18-2 should transpire. Under these circumstances, the second base station 18-2 transmits a signal over LAN 28 to the first base station 18-1 requesting a transition. Once the first base station 18-1 acknowledges this request, it forwards the call to the second base station 18-2 and service is continued without disruption. For example, the call may be forwarded over LAN 28 using Voice Over Internet Protocol (VoIP) techniques.

The discussion up to this point has been directed toward seamless transitions between licensed and unlicensed wireless services. Attention now turns to other aspects of the invention. Another aspect of the invention is a technique for assigning a base station to a landline telephone number. Another aspect of the invention is a technique for authenticating a user for unlicensed wireless services. Advantageously, authentication is implemented through reliance upon existing authentication infrastructure associated with the licensed wireless network. Thus, a separate authentication scheme need not be implemented. Another aspect of the invention that is discussed below is the provisioning of a base station into the overall licensed wireless network. As discussed below, the provisioning operation is automatically performed and therefore does not require technical sophistication or expertise on behalf of the user.

Figure 9:
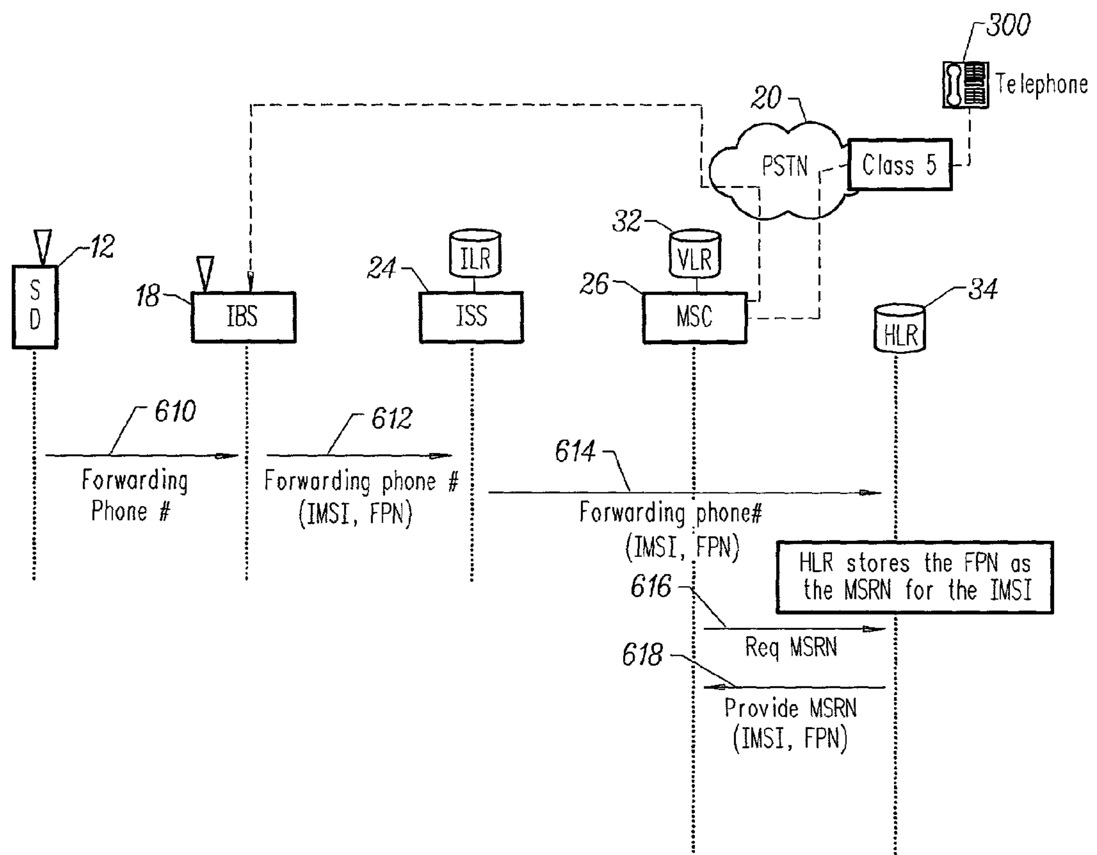
FIG. 9 illustrates the forwarding of a licensed wireless call to a base station in accordance with an embodiment of the invention.

FIG. 9 illustrates a technique for assigning a landline number to a base station 18. Upon installation and power-up, the base station 18 queries the subscriber device 12 for the local landline phone number to which the base station is connected. In some embodiments, the base station 12 will also solicit the Internet Protocol (IP) address for the system server 24. After the user enters the phone number and/or IP address into the subscriber device 12, the information is transmitted to the base station 18, as shown with arrow 610 of FIG. 9. The base station 18 forwards the same information to the system server 24, as shown with arrow 612. The system server 24 then transmits this information for storage in the HLR 34, as shown with arrow 614. Once stored in the HLR 34, the MSC 26 can access the number as a mobile system roaming number (MSRN), as shown with arrows 616 and 618. Thereafter, the mobile system roaming number can be used in a conventional manner to route a call to the base station 18. Alternately, the MSRN may be a number corresponding to a number associated with the system server 24. In which case, the system server 24 sends the call to the base station 18.

Another aspect of the invention is authentication. As previously indicated, the invention utilizes the authentication infrastructure associated with the licensed wireless network to authenticate users for the unlicensed wireless network.

Figure 10:
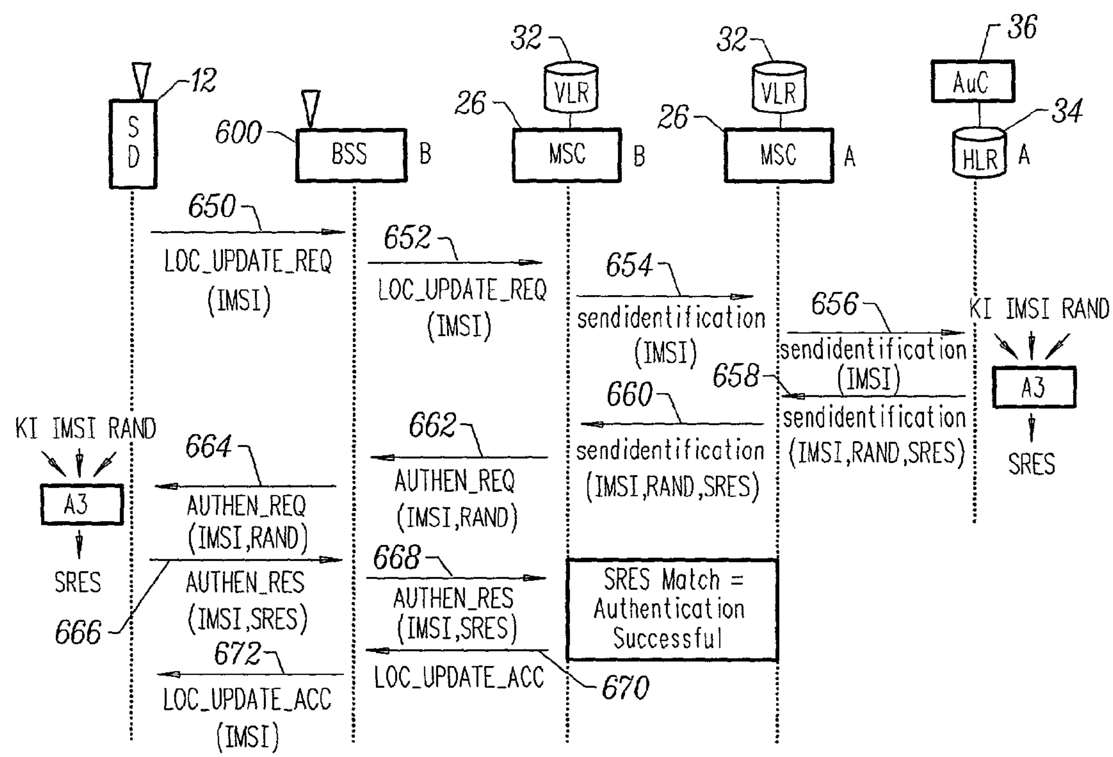
FIG. 10 illustrates a prior art licensed wireless authentication procedure.

FIG. 10 illustrates a licensed wireless system authentication process utilized in accordance with the prior art. In this example, the subscriber device 12 moves from the coverage area served by its home MSC (referred to as MSC-A) to the coverage area served by MSC-B. As soon as the subscriber device 12 enters a cell that is served by MSC-B, it registered with the system by sending an authentication request and a location update to Base Station System (BSS) 600, as shown with arrow 650. The location update request includes an international mobile subscriber identity (IMSI).

BSS 600 forwards this information to the VLR 32 associated with MSC-B, as shown with arrow 652. The VLR of MSC-B in turn sends a message to the VLR and HLR of the SMC-A, as shown with arrows 654 and 656. This information serves as a request for authentication of the subscriber device 12 as well as to inform the HLR 34 of the current location of the subscriber device 12 as served by the MSC-B. The authentication is performed as follows.

The authentication center (AuC) 36 generates a parameter called SRES (signed response). In order to generate the SRES, it uses an authentication algorithm A3, such as a public key/private key algorithm. The algorithm A3 processes a secret key Ki, a random number RAND, and the IMSI to produce the SRES. The IMSI, RAND, and SRES are passed to the MSC-A (arrow 658) and MSC-B (arrow 660). The SRES is temporarily stored at the MSC-B until the authentication operation is completed. The MSC-B passes the IMSI and the RAND to the BSS, which passes the information to the subscriber device 12. Based upon the IMSI and the RAND that it receives (referred to herein as licensed wireless communication system security information), along with the secret key Ki that it stores, the subscriber device 12 executes the same authentication algorithm A3. This results in the subscriber device 12 producing a SRES, which is referred to as an authentication result. If the subscriber device is legitimate, it has the same secret key Ki encoded in it as the one in the HLR. The service provider encodes this key at the time of activating the subscriber. This key is known only to the subscriber device and to the HLR.

The SRES, or authentication result, generated by the subscriber device 12 is passed with the IMSI to the BSS-B (arrow 666), which passes it to the MSC-B (arrow 668). The MSC-B compares the SRES generated by the subscriber device 12 to the SRES generated by the HLR. Authentication is only successful if the two numbers match. The SRES generated by the HLR can be referred to as an authentication value. If the authentication value from the HLR matches the authentication result from the subscriber device 12, then an authentication command is generated.

Figure 11:
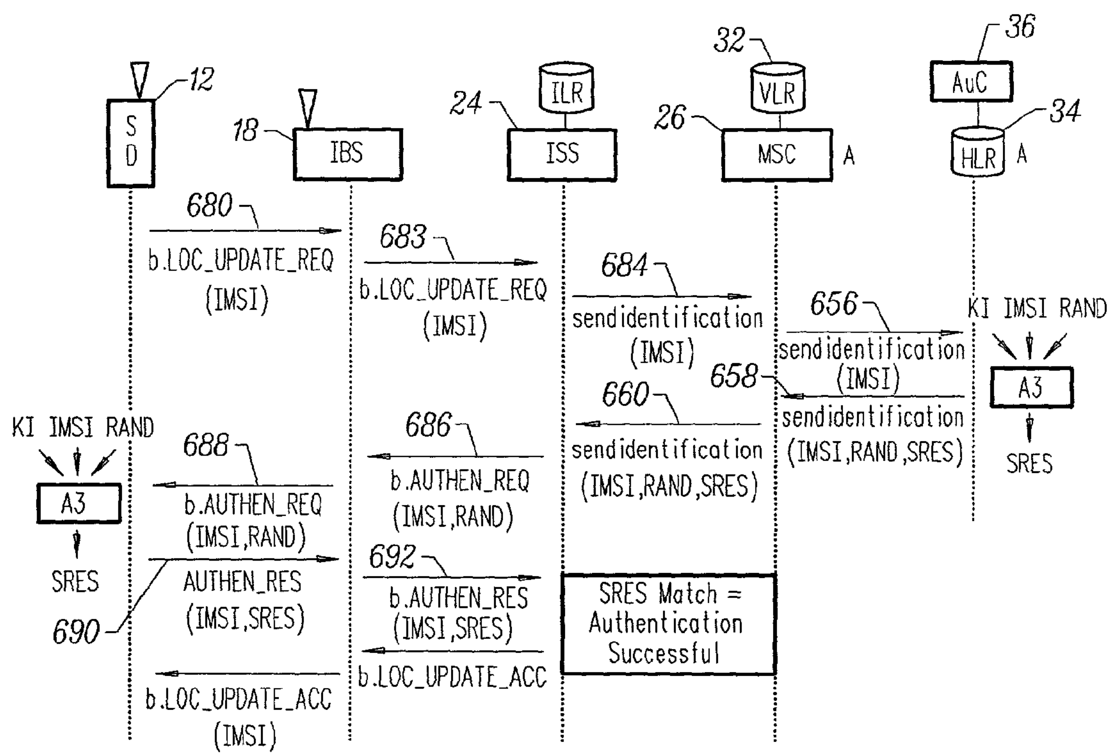
FIG. 11 illustrates an unlicensed wireless authentication procedure utilized in accordance with an embodiment of the invention.

The above process assists in understanding the authentication process included in the present invention, as the new method is designed to utilize the existing authentication process already existent in the licensed wireless system. FIG. 11 illustrates an authentication process in accordance with the present invention. In accordance with the invention, the base station 18 is designed to emulate a BSS 600, and the system server 24 is designed to emulate an MSC 26.

When the subscriber device 12 enters the service area of the base station 18, it registers with the base station. The authentication module 124 of the subscriber device 12 subsequently intercepts the registration message that is typically sent to the licensed wireless base station (e.g., BSS 600). This information, referred to as a licensed wireless authentication request, is sent to the base station 18, as shown with arrow 680. The base station 18, at the direction of the authentication module 230, routes the information to the system server 24. In particular, the authentication module 230 of the base station 18 forms an Internet Protocol (IP) packet containing the information and routes it to the system server 24. As shown with arrow 684, the system server 24 forwards the information to the MSC-A. The authentication module 422 of the system server 24 may be used for this purpose. In this capacity, the authentication module 44 assists the system server 24 in its operation of emulating a VLR. The operations at arrows 656, 658, and 660 are identical to the operations performed in the prior art system of FIG. 10.

At this point, the system server 24 stores the SRES, instead of an MSC. The system server 24 forwards the IMSI and RAND information to the base station 18, as shown with arrow 686. The base station 18, emulating a BSS, passes this information to the subscriber device 12. The authentication operation performed at the subscriber device is conventional, with the subscriber device returning an authentication result (e.g., an IMSI and a SRES) to the base station 18, as shown with arrow 690. The base station 18 passes this information to the system server 24, as shown with arrow 692. The system server 24 then checks for an SRES match. That is, the system server compares the authentication result produced by the subscriber device 12 to the authentication value (e.g., SRES) received from the MSC-A. Recall that this operation was performed by the MSC 26 in the prior art system of FIG. 10. In the event of a match between the computed SRES values, an authentication command is produced and unlicensed wireless services may be delivered to the subscriber device 12 through the base station 18.

Preferably, authentication is not performed every time the subscriber device registers with the base station 18. Instead, the authentication module 230 of the base station 18 preferably stores previous authentication information and locally re-authenticates without accessing the system server 24. This implementation is faster and otherwise reduces network traffic.

Yet another aspect of the invention involves provisioning of a base station in order to facilitate the licensed-to-unlicensed wireless communications achieved in accordance with the invention. By way of overview, the provisioning operation of the invention entails the base station 18 automatically configuring itself. In one embodiment, provisioning is accomplished by initially accessing a provisioning server. Subsequently, the base station registers with the system server. In the event that Internet access is available to the base station, the base station uses the Internet to access the provisioning server and the system server. If Internet access is not available, a Short Message Service Center may be used during the provisioning operation.

Figure 12:
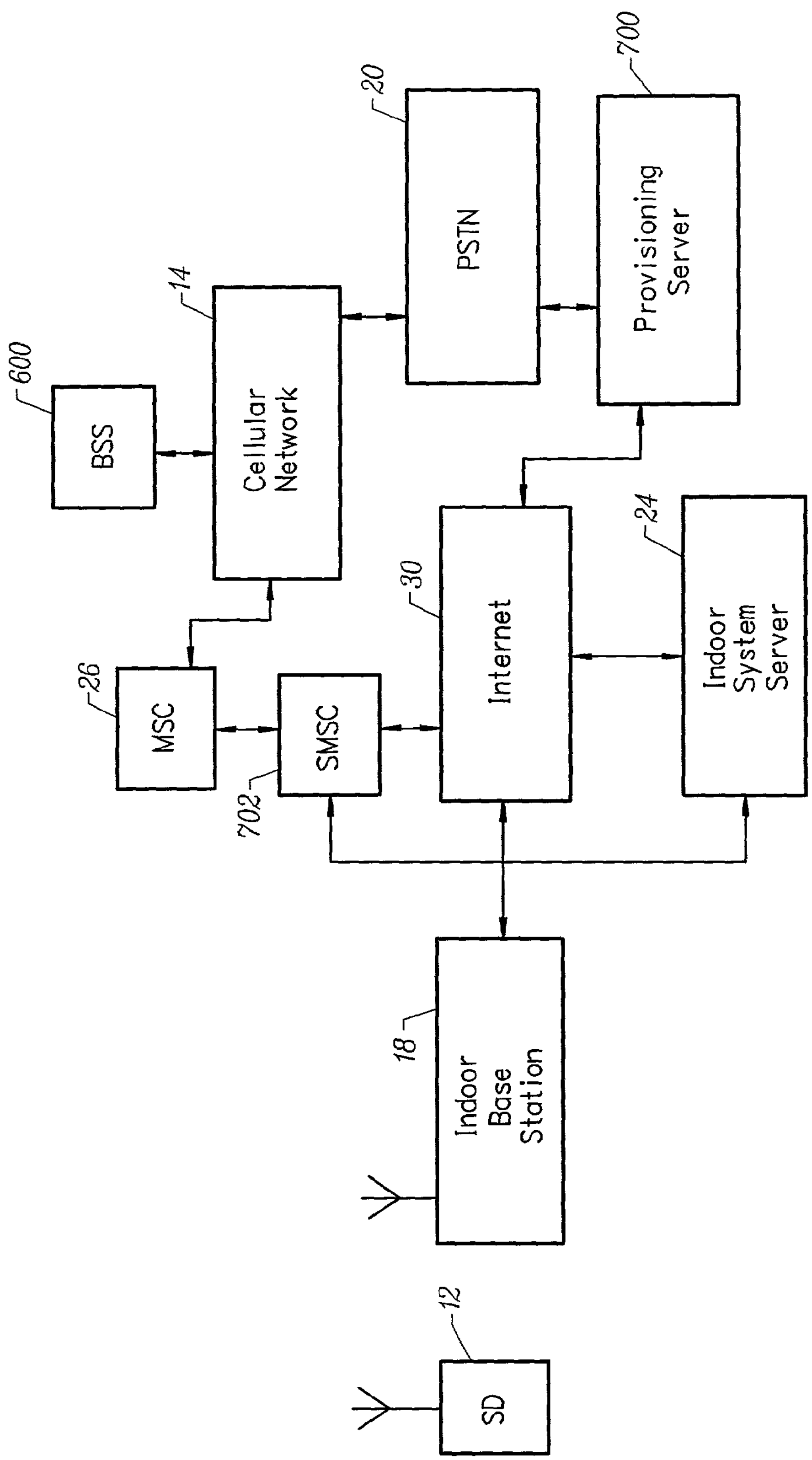
FIG. 12 illustrates system components utilized in a provisioning operation associated with an embodiment of the invention.

FIG. 12 illustrates equipment utilized during the provisioning operation. In particular, the figure illustrates a subscriber device 12 and a base station 18. In one embodiment, the base station 18 uses the Internet 30 to access a provisioning server 700. For example, the base station 18 may access the Internet through a broadband modem, such as DSL. The provisioning server 700 supplies a service profile to the system server 24, as discussed more fully below. In another embodiment of the invention, the base station 18 is provisioned through a wireless connection. In particular, a wireless link is established using a Short Messaging Service or packet data services supported by the cellular system. For example, a short messaging service message can be sent from the base station 18 to the subscriber device 12, which then delivers the message to the BSS 600. The BSS 600 delivers the message to the cellular network 14, which delivers the message to the MSC 26. The MSC 26 routes the message to the Short Message Service Center (SMSC) 702, which routes the message over the Internet 30 to the provisioning server 700. Information from the provisioning server 700 is delivered to the system server 24 and the base station 18 through a reverse path.

Figure 13:
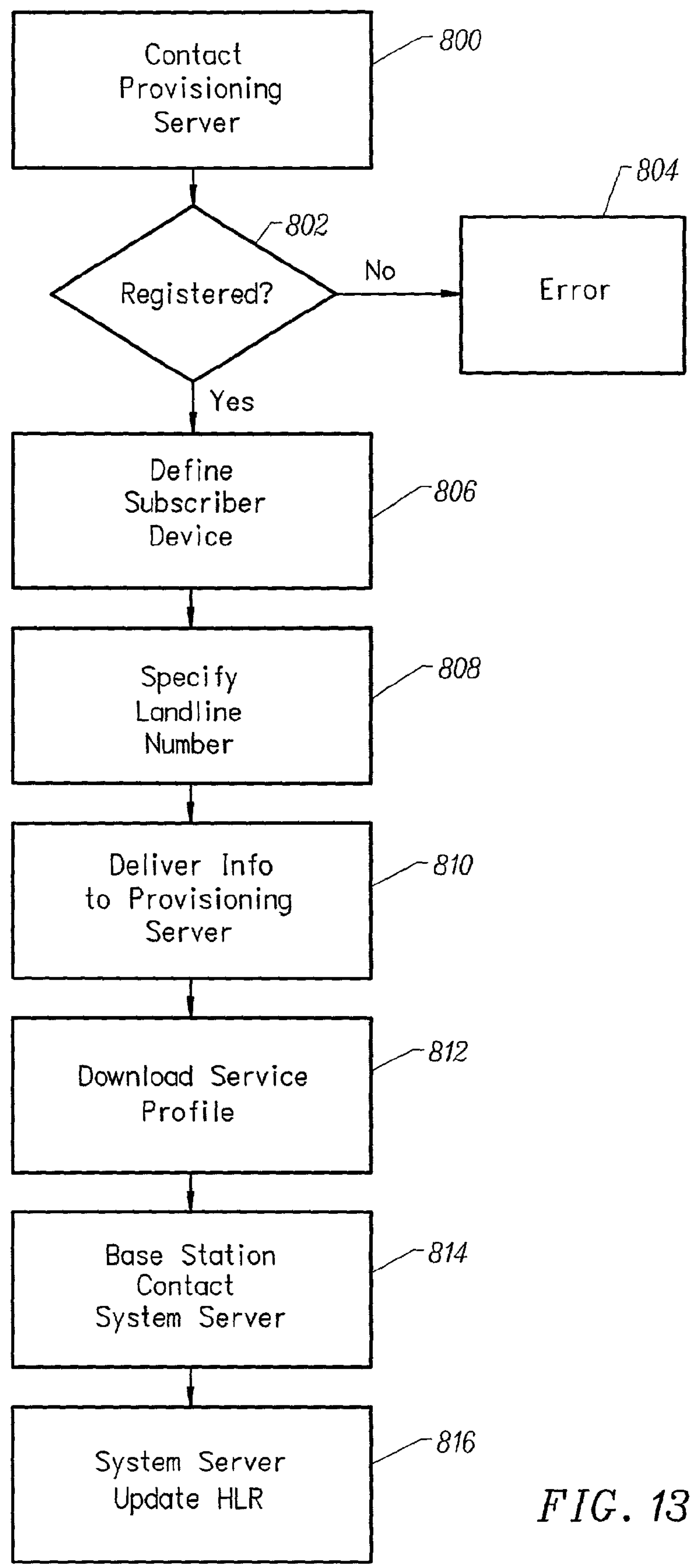
FIG. 13 illustrates provisioning operations performed in accordance with an embodiment of the invention.

FIG. 13 illustrates the process steps involved when the system of FIG. 12 carries out the provisioning process. The process is typically initiated upon installation and activation of a new base station 18, and will be discussed in that context, but those of skill in the art will see that it can be performed any time that provisioning information must be updated.

When a base station 18 is initially powered up it contacts the provisioning server 700 (step 800). The provisioning module 226 of the base station 18 coordinates this operation. In one embodiment, contact is made through the Internet 30 using one or more preprogrammed IP addresses for the provisioning server. Alternately, the provisioning server may be accessed through the SMSC, as discussed above. The base station 18 then identifies itself to the provisioning server 700, for example, using a code preprogrammed at the time of manufacture. If the provisioning server 700 does not recognize the base station, the base station preferably provides an error indication. If the provisioning server 700 recognizes the base station, that processing proceeds to block 806.

At this point, the base station broadcasts a signal to the subscriber device 12 instructing it to define itself (block 806). For example, the subscriber device 12 may define itself by sending to the base station 18 an electronic serial number or a portion of an electronic serial number. This defining information is used to establish an association between the base station 18 and the subscribe device 12. This local association is mapped with a local authentication procedure. Thereafter, whenever the subscriber device and the base station come into contact, they identify each other by passing the local authentication procedure. The two devices can only communicate if the local authentication procedure is successful.

The provisioning module 127 of the subscriber device 12 prompts the user to enter the landline telephone number associated with the base station 18 (block 808). This information is then passed to the base station 18. The base station then delivers information to the provisioning server (block 810). For example, the base station will typically deliver the landline telephone number and a base station identification number to the provisioning server. The provisioning server then downloads a service profile to the base station and the system server (block 812). The service profile can include the landline telephone number and caller services, such as call waiting, caller identification, and the like. The service profile may also include an IP address for the base station. The IP address allows packet data to be delivered to the base station. The service profile also includes the IP address of a system server 24 assigned to the base station 18. Typically, the system server 24 is selected based upon proximity to the base station, as derived from the area code associated with the landline telephone number.

Observe that the provisioning server operates as a central registration point for all devices within the system. This central point makes it easier to modify system wide services. In addition, the provisioning server provides the benefit that a single address is programmed into each base station.

The base station takes the IP address of the system server from the service profile and contacts the system server (block 814). If the service profiles match, an association is established between the system server, the base station, and the subscriber device. The system server subsequently updates the HLR of the subscriber device with contents of the service profile (block 816). At this point, the authentication process of FIG. 11 would typically be performed. This provisioning process can be repeated whenever a new device 12 or base station 18 is introduced into the system.

Another aspect of the invention allows licensed wireless service users to seamlessly change between a desktop phone and a subscriber device 12 during a call, thus allowing them to use the most comfortable device at a given time. Thus, when a subscriber device 12 is located within a coverage area 16, a user can simply pick up the desktop phone and continue their conversation. The subscriber device 12 can then be disconnected without any interruption in service. In this embodiment, the desktop phone and the base station are connected to the same landline, thereby providing this interchangeability. Likewise, when a caller is using a desktop phone within an area 16, he or she can activate a subscriber device 12 and continue a call from there. In this instance, a button on the subscriber device is used to initiate communication with the base station that is connected to same landline. Subsequently hanging up the desktop phone will not interrupt service. Observe in this context that when the subscriber device is within the coverage area 16 of the base station 18, both the subscriber device 12 and a desktop telephone may simultaneously ring in response to a call. The user can then pick up either device.

The foregoing description, for purposes of explanation, used specific nomenclature to provide a through understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, the thereby enable other skilled in the art to best utilize the invention and various embodiments with various modifications as are suited to the particular use contemplated. It is intended that the following claims and their equivalents define the scope of the invention.

What is claimed is:

1. A method of authenticating an unlicensed wireless communication subscriber device to utilize an unlicensed wireless communication system based on security information supplied by a licensed wireless communication system, wherein the unlicensed wireless communication system comprises a networked computer for communicatively coupling the unlicensed wireless communication system and the licensed wireless communication system, the method comprising:

sending licensed wireless communication system security information from the networked computer to the unlicensed wireless communication subscriber device;

receiving an authentication result at the networked computer from said unlicensed wireless communication subscriber device, the authentication result produced by the subscriber device based at least partly on the licensed wireless communication system security information;

comparing, at the networked computer, said authentication result with an authentication value received from the licensed wireless communication system to selectively produce an authentication command to allow the subscriber device to access the unlicensed wireless communication system; and enabling unlicensed wireless communications between said subscriber device and the unlicensed wireless communication system in response to said authentication command;

wherein said unlicensed wireless communication subscriber device is for communicating with the licensed wireless communication system using licensed wireless frequencies and for communicating with said unlicensed wireless communication system using unlicensed wireless frequencies.

2. The method of claim 1 further comprising, prior to said sending, receiving a licensed wireless authentication request from said unlicensed wireless communication subscriber device at said networked computer.

3. The method of claim 2, wherein said request is received at said networked computer through an unlicensed wireless communication base station, wherein said networked computer is operative to emulate a mobile switching center.

4. The method of claim 2, wherein said licensed wireless authentication request is received as an Internet Protocol packet.

5. The method of claim 2, further comprising routing said licensed wireless authentication request from said networked computer to a mobile switching center.

6. The method of claim 5 further comprising receiving said licensed wireless communication system security information at said networked computer from said mobile switching center.

7. The method of claim 1, wherein said licensed wireless communication system security information includes a random number.

8. The method of claim 6, wherein said licensed wireless communication system security information passes from said unlicensed wireless communication base station to said unlicensed wireless communication subscriber device prior to said receiving the authentication result.

9. The method of claim 1, wherein said authentication result is produced by said unlicensed wireless communication subscriber device using said licensed wireless communication system security information and a stored key.

10. The method of claim 1, wherein said comparing results in said authentication command when said authentication value matches said authentication result produced by said unlicensed wireless communication subscriber device.

11. The method of claim 1 further comprising utilizing said authentication result when said unlicensed wireless communication subscriber device leaves and later returns to an unlicensed wireless communication service region.

12. A method of authenticating an unlicensed wireless communication subscriber device to utilize an unlicensed wireless communication system based on security information supplied by a licensed wireless communication system, wherein the unlicensed wireless communication system comprises a networked computer for communicatively coupling the unlicensed wireless communication system and the licensed wireless communication system, the method comprising:

identifying when the unlicensed wireless communication subscriber device is within a service region of an unlicensed wireless communication base station;

emulating, with said networked computer, operations of a licensed wireless communication system mobile switching center in response to said identifying;

receiving licensed wireless communication system security information from the licensed wireless communication system at said networked computer;

sending said licensed wireless communication system security information to said subscriber device;

receiving an authentication result from the subscriber device in response to said emulating, the authentication result produced by the subscriber device using the licensed wireless communication system security information; and comparing said authentication result with an authentication value received from said licensed wireless communication system to selectively enable, based on said comparison, unlicensed wireless communication between said unlicensed wireless communication subscriber device and said unlicensed wireless communication system;

wherein said unlicensed wireless communication subscriber device is for communicating with the licensed wireless communication system using licensed wireless frequencies and for communicating with said unlicensed wireless communication system using unlicensed wireless frequencies.

13. The method of claim 12, wherein identifying includes receiving a licensed wireless authentication request at the networked computer from said unlicensed wireless communication subscriber device through said unlicensed wireless communication base station.

14. The method of claim 13, wherein said emulating includes the networked computer reacting to the licensed wireless authentication request as though the networked computer were a mobile switching center.

15. The method of claim 13, wherein said licensed wireless authentication request is received at said networked computer as an Internet Protocol packet.

16. The method of claim 13 further comprising routing said licensed wireless authentication request from said networked computer to a mobile switching center.

17. The method of claim 16 further comprising sending, from said networked computer to said unlicensed wireless communication base station, licensed wireless communication system security information routed from said mobile switching center.

18. The method of claim 12, wherein said licensed wireless communication system security information includes a random number.

19. The method of claim 12, wherein said licensed wireless communication system security information passes from said unlicensed wireless communication base station to said unlicensed wireless communication subscriber device.

20. The method of claim 12, wherein said authentication result is produced by said unlicensed wireless communication subscriber device using said licensed wireless communication system security information and a stored key.

21. The method of claim 12, wherein the networked computer produces an authentication command to enable said unlicensed wireless communication subscriber device to utilize the unlicensed wireless communication system when the authentication value matches said authentication result produced by said unlicensed wireless communication subscriber device.

22. The method of claim 21 further comprising:

storing the authentication value at the networked computer; and utilizing said stored authentication value to authenticate the subscriber device when said unlicensed wireless communication subscriber device returns to said service region.

* * * * *